United States Patent [19]
Omi et al.

[11] Patent Number: 5,648,943
[45] Date of Patent: Jul. 15, 1997

[54] DISK RECORDING/REPRODUCTION DEVICE OF REDUCED THICKNESS WITH DRIVING MECHANISM FOR MOVING HEADS PARALLEL TO THE DISK FACE

[75] Inventors: Yoshiyuki Omi, Higashihiroshima; Seiichi Fujii, Hiroshima; Sadao Uchiyama, Higashihiroshima; Shigeki Tsuji, Higashihiroshima; Masanobu Katsuki, Higashihiroshima; Yoshio Katayama, Higashihiroshima, all of Japan

[73] Assignee: Sharp Kabushiki Kaisha, Osaka, Japan

[21] Appl. No.: 455,397

[22] Filed: May 31, 1995

[30] Foreign Application Priority Data

Oct. 3, 1994 [JP] Japan .................... 6-238873

[51] Int. Cl.$^6$ ............ G11B 11/00; G11B 33/02; G11B 5/00
[52] U.S. Cl. ............ 369/13; 369/75.2; 369/77.2; 360/59; 360/114; 365/12
[58] Field of Search ............ 369/13, 75.2, 77.2; 360/59, 114; 365/12

[56] References Cited

U.S. PATENT DOCUMENTS

| | | | |
|---|---|---|---|
| 5,416,753 | 5/1995 | Kanazawa et al. | 369/13 |
| 5,471,356 | 11/1995 | Tsuji | 369/77.2 |

FOREIGN PATENT DOCUMENTS

| | | |
|---|---|---|
| 0524839A2 | 1/1993 | European Pat. Off. . |
| 0554065A2 | 8/1993 | European Pat. Off. . |
| 0571227 A2 | 11/1993 | European Pat. Off. . |
| 0606911A2 | 7/1994 | European Pat. Off. . |
| 0609024A2 | 8/1994 | European Pat. Off. . |
| 5-325369 | 12/1993 | Japan . |

*Primary Examiner*—Frank G. Font
*Assistant Examiner*—Jason D. Vierra Eisenberg
*Attorney, Agent, or Firm*—Nixon & Vanderhye P.C.

[57] ABSTRACT

A disk recording/reproduction device according to the present invention includes: a recording medium including a disk and a protective case for the disk; loading mechanism for guiding the recording medium from a first position outside the disk recording/reproduction device in a first direction in a linear manner, then to a second position located inside the disk recording/reproduction device, and thereafter in a second direction perpendicular to the first direction to a third position, the first position allowing the recording medium to be taken out and the third position allowing information to be recorded on the recording medium; a pickup; a pickup driving mechanism for moving the pickup in parallel to a recording face of the disk; a magnetic head opposing the pickup so as to interpose the disk and moving in parallel to the disk integrally with the pickup; and head position switching mechanism for detaching the magnetic head from the disk and positioning the magnetic head in either a recordable position or a stand-by position. A position retention mechanism locates the recording medium in a fourth position between the second and third positions. The magnetic head moves to the recordable position when the recording medium is in the third position. The magnetic head and the pickup move between a position opposing the protective case and a retracted position away from the position opposing the protective case. When the recording medium is in the fourth position, the magnetic head and the pickup are moved from the position opposing the protective case to the retracted position and from the retracted position to the position opposing the protective case.

9 Claims, 23 Drawing Sheets

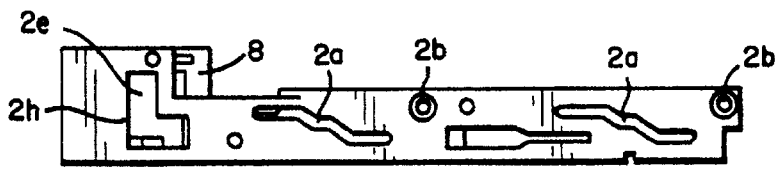
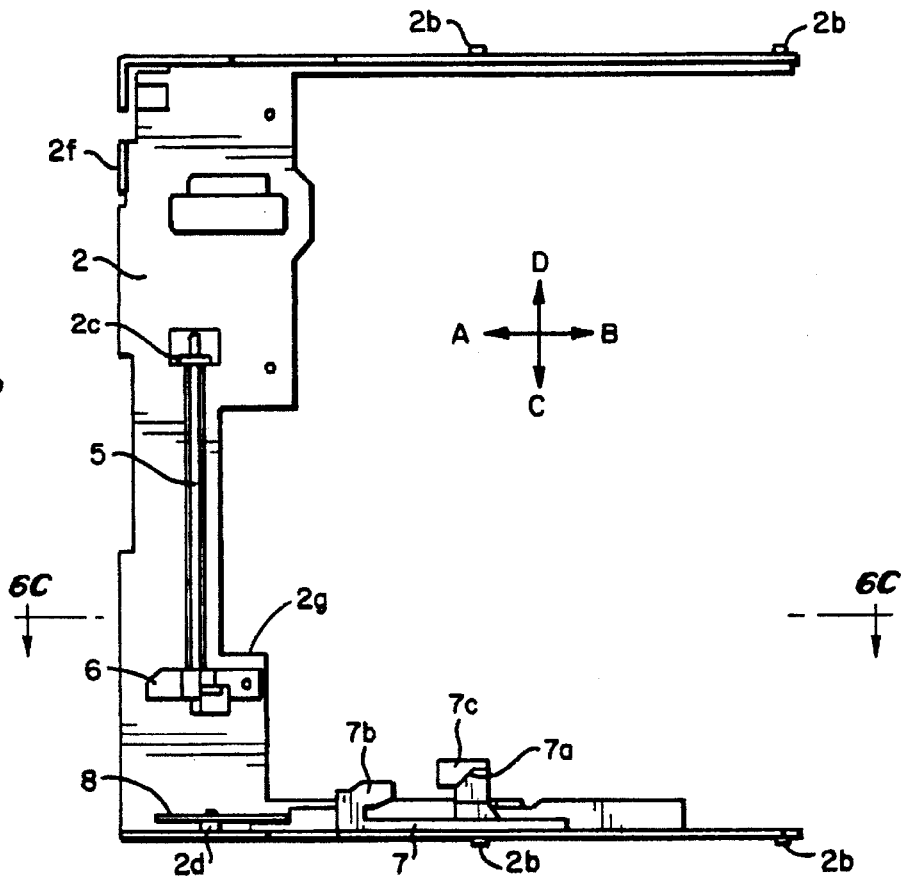
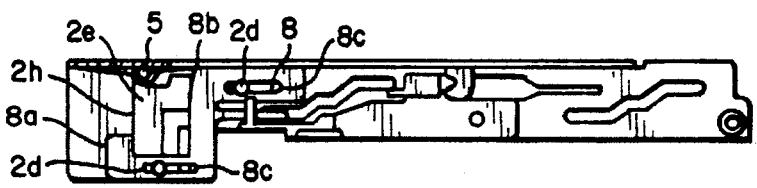
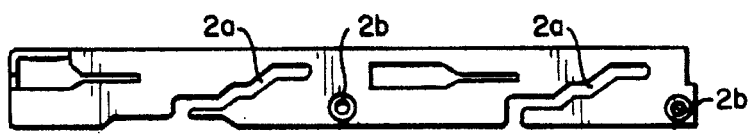

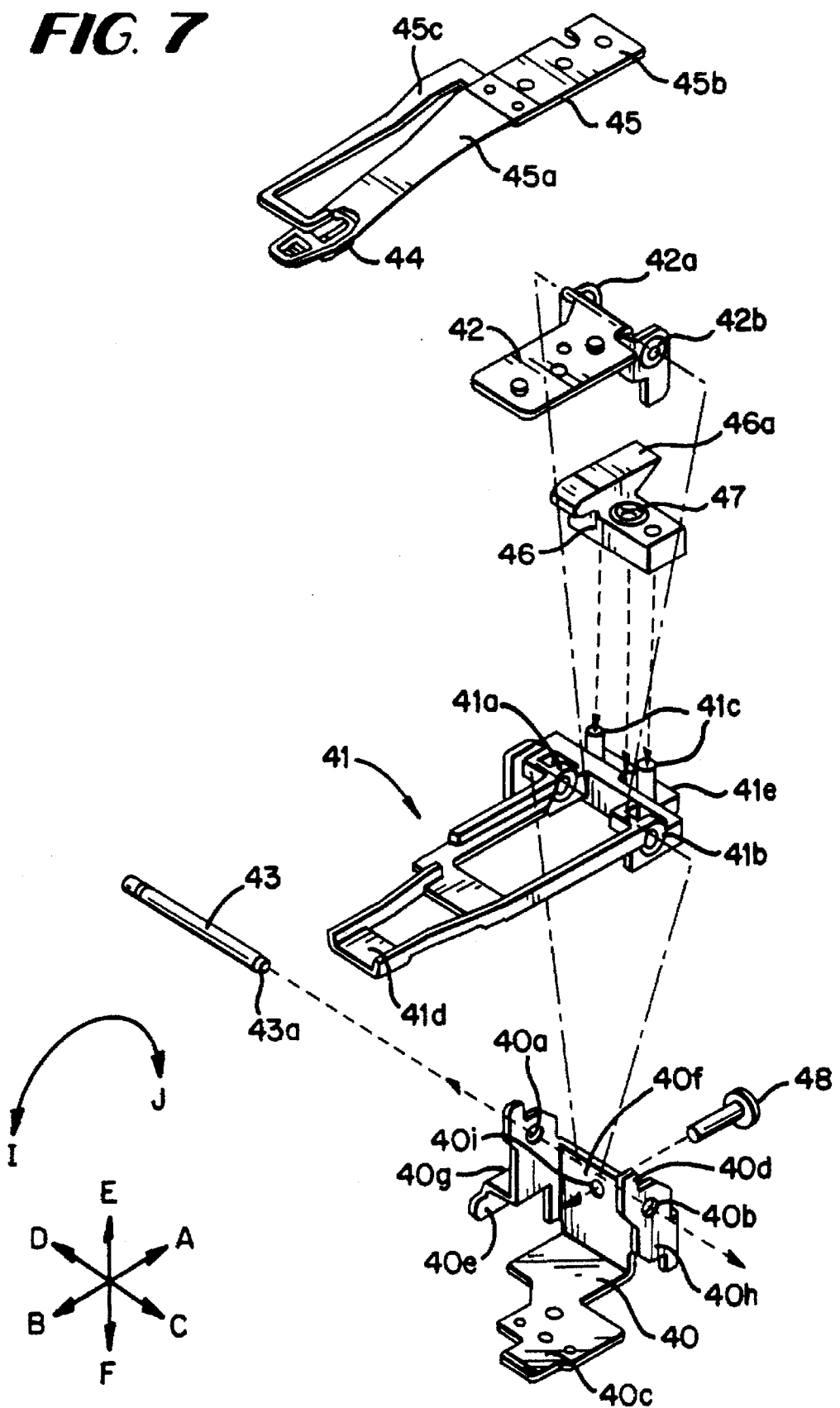

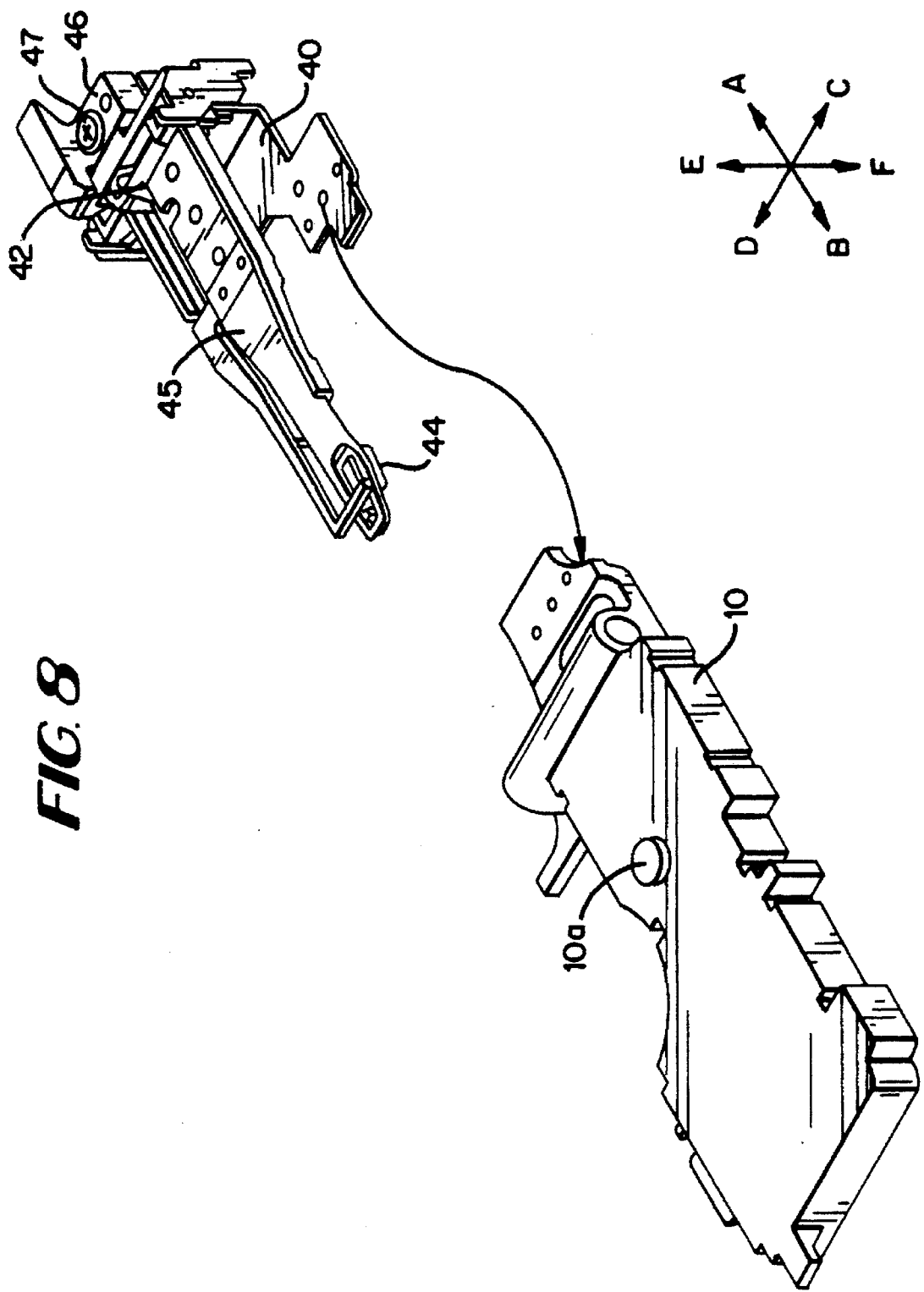

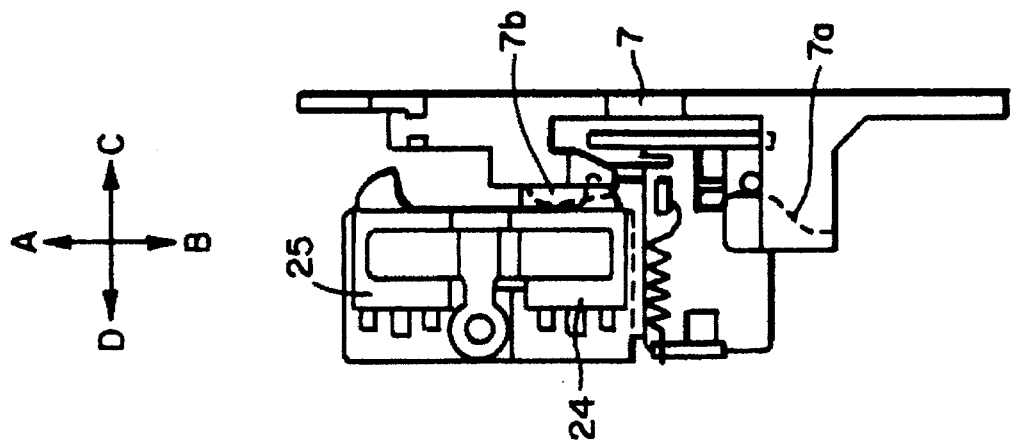
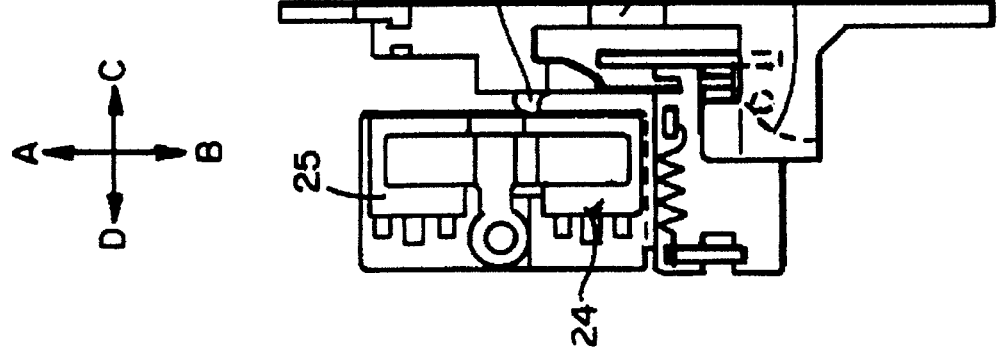
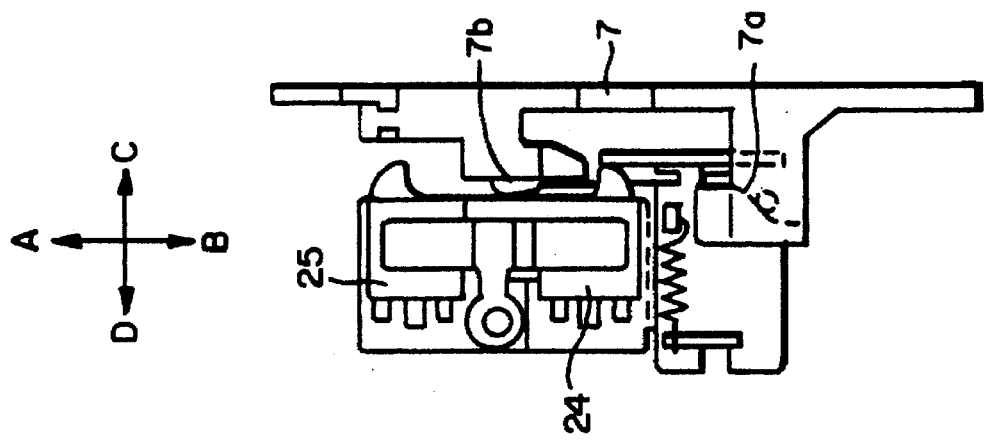

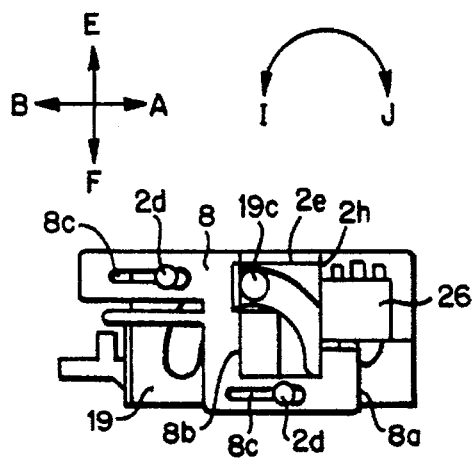
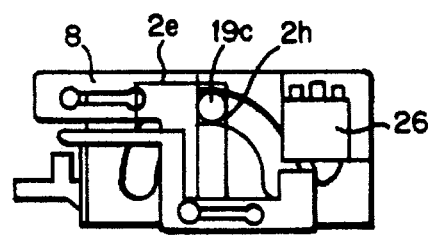
FIG. 10A   FIG. 10B
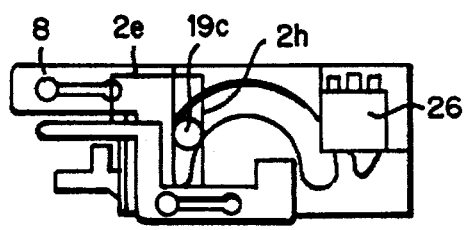
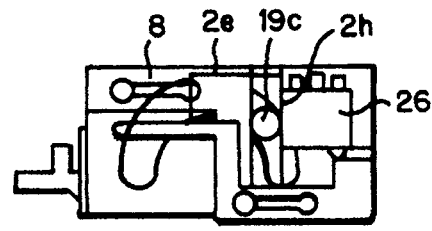
FIG. 10C   FIG. 10D

FIG. 15

| | | Detachable position | Movable position | Reproducible position | Recordable position |
|---|---|---|---|---|---|
| 1st mode detection switch | OFF / ON | | | | |
| 2nd mode detection switch | OFF / ON | | | | |
| 3rd mode detection switch | OFF / ON | | | | |
| 4th mode detection switch | OFF / ON | | | | |
| Cartridge (Cartridge holder) | Attach/detachment height / Retraction height / Mounting height | | | | |
| Cartridge detection switch | OFF / ON | | | | |
| Magnetic head | UP / TOUCH | | | | |

Direction of loading →

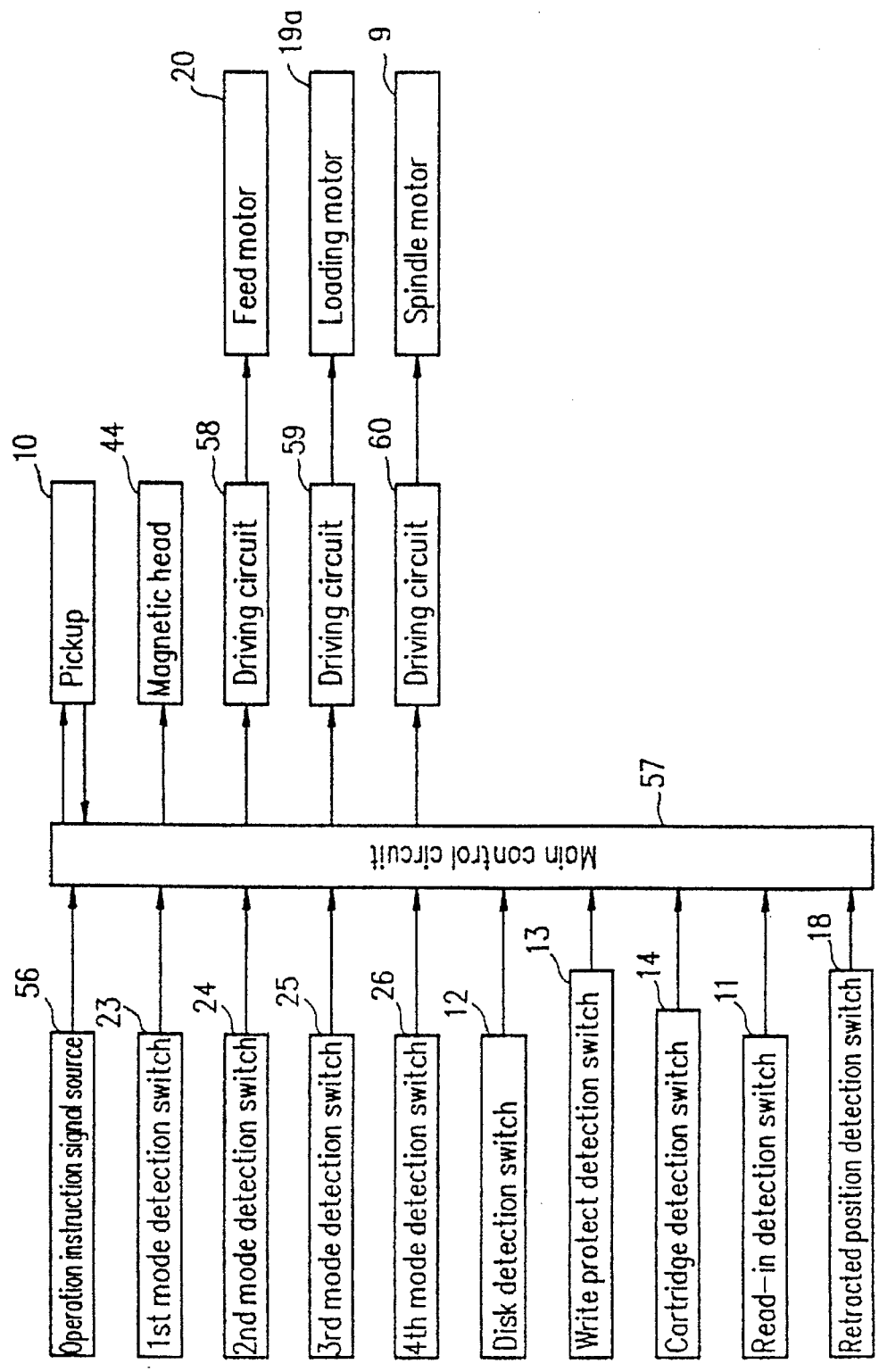

DISK RECORDING/REPRODUCTION DEVICE OF REDUCED THICKNESS WITH DRIVING MECHANISM FOR MOVING HEADS PARALLEL TO THE DISK FACE

BACKGROUND OF THE INVENTION

1. Field of the Invention

The present invention relates to a recording device for recording information on a recording medium consisting essentially of a disk accommodated in a protective case, such as MDs (Mini Disks).

2. Description of the Related Art

Recording media that are protected by a cartridge (protective case), such as magneto-optical disks and optical disks, have recently come into use. FIGS. 22A to 22D show a front-loading system, which is one kind of mechanism for mounting such a disk protected by a cartridge.

Hereinafter, the front-loading system will be described with reference to FIGS. 22A to 22D. As shown in FIGS. 22A to 22D, an object lens 101a of a pickup 101 must go inside a cartridge 113 via a window 113a formed in the cartridge 113. Moreover, a turntable 102 for rotating a disk 112 must go inside the cartridge 113 via a hole (not shown) in the center of the cartridge 113. Accordingly, the cartridge 113 is required to take a loading path such that the cartridge 113 is moved in the direction of arrow A and then moved in the direction of arrow F.

As for methods for recording information on magneto-optical disks, an magnetic field modification overwriting method has come to be used, in which a laser beam emitted from a pickup is focused on a disk so as to increase the temperature thereof, and the magnetic poles of a magnetic head disposed opposite to the pickup with respect to the disk are alternated, whereby information is recorded on the disk. In order to achieve high reliability and low power consumption by the magnetic head according to this recording method, the pickup and the magnetic head are required to maintain highly precise relative locations such that they oppose each other with a disk interposed therebetween.

The mechanism of the pickup 101 and a magnetic head 109 will be described with reference to FIGS. 22A to 22D.

The pickup 101 is attached to guide shafts 103 and 104 which are attached in parallel to a main chassis (not shown), the pickup 101 being slidable along a direction perpendicular to the paper on which FIGS. 22A to 22D are described. A driving grip 105 fixed on the pickup 101 is pressed onto a driving screw 106 attached to the main chassis. Thus, driving force from a sending motor (not shown) is transmitted to the pickup 101 via the driving screw 106, thereby moving the pickup 101 along the direction perpendicular to the paper. A magnetic head attachment angle 107 is fixed on the pickup 101. A magnetic head attachment lever 108 is attached to the magnetic head attachment angle 107 so as to be capable of rotating. The magnetic head 109 is attached to the farthest end in the direction of arrow B of the magnetic head attachment lever 108. The magnetic head attachment lever 108 is loaded by a spring 111 in such a way that the magnetic head 109 is ready to move in the direction of arrow F. An upper face of the magnetic head attachment lever 108 abuts with an axis 110 which can move in the directions of arrows A and B, whereby the position of the magnetic head 109 is maintained.

The cartridge 113 is guided by a cartridge holder (not shown) and is moved in the direction of arrow a from a detachable position shown in FIG. 22A to a snug position shown in FIG. 22B, and then moved in the direction of arrow F from the snug position shown in FIG. 22B to a reproducible position shown in FIG. 22C. The reproducible position (FIG. 22C) is identical with a recordable position shown in FIG. 22D with respect to the position of the cartridge 113.

In the detachable position (FIG. 22A) and in the snug position (FIG. 22B), the magnetic head 109 is in a stand-by state where the magnetic head 109 does not contact the cartridge 113, which travels vertically (i.e., in the direction of arrow E or arrow F) during the loading thereof. In the reproducible position (FIG. 22C), the magnetic head 109 is still detached from the cartridge 113. In the recordable position (FIG. 22D), the magnetic head 109 is in contact with the disk 112 so as to enable recording, the magnetic head 109 having traveled into the cartridge 113 through the window 113b. Vertical movements of the magnetic head 109 are achieved by the rotation of the magnetic head attachment lever 108, which in turn is caused by the axis 110 moving in the directions of arrows A or B so as to abut with the magnetic head attachment lever 108 on different planes. Thus, the magnetic head 109 is retracted vertically with respect to the loading path of the cartridge 113.

However, in the front-loading system, the above-mentioned retraction of the magnetic head 109, which takes the magnetic head 109 out of the loading path exclusively along the vertical direction with respect to the recording face of the disk, may cause a problem in that the magnetic head 109 must be retracted by a large distance along the vertical direction, thereby making it difficult to reduce the thickness of the disk recording/reproduction device. The issue of reduction of the thickness of a disk recording/reproduction device becomes critical when the disk recording/reproduction device is incorporated as an external memory device for a notebook-type personal computer.

In view of the above-mentioned problem, the applicant of the present application has proposed a device in Japanese Patent Application No. 6-150132. In accordance with this device, a magnetic head is so constructed as to be capable of being connected to and detached from a pickup. The magnetic head is detached from the pickup during the loading of a recording medium (disk) so as to be alone moved horizontally, i.e., in parallel to a recording face of the disk, thereby to locate the magnetic head in a retracted position away from a position in which the magnetic head opposes a protective case of the recording medium (hereinafter, this position will be referred to as an "opposing position"). In accordance with this technique, the entire recording/reproduction device can be decreased in thickness as compared with the above-mentioned conventional method where the magnetic head is moved vertically with respect to a recording face of a disk so as to be retracted out of a loading path.

Although the above-mentioned technique proposed in Japanese Laid-Open Patent Application No. 6-150132 achieves reduction in the thickness of the entire device, it requires a complicated mechanism for connecting/disconnecting the magnetic head to/from the pickup, which leads to an increase in the number of movable parts, thereby increasing the possibility of malfunction. Thus, the reliability of the device may not be sufficient. By repetitive connection and disconnection, the relative positions of the magnetic head and the pickup, in particular, may vary although required to be highly precise. This could result in an adverse effect on the recording performance of the device.

SUMMARY OF THE INVENTION

A disk recording/reproduction device according to the present invention includes: a recording medium including a disk and a protective case for accommodating the disk; loading means for guiding the recording medium from a first position located outside the disk recording/reproduction device in a first direction in a substantially linear manner, guiding the recording medium to a second position located inside the disk recording/reproduction device, and thereafter guiding the recording medium in a second direction substantially perpendicular to the first direction from the second position to a third position, wherein the first position allows the recording medium to be taken out and the third position allows information to be recorded on the recording medium; a pickup for radiating a laser light beam on a recording face of the disk; pickup driving means for moving the pickup in parallel to the recording face of the disk; a magnetic head opposing the pickup with the disk interposed therebetween and moving in parallel to the recording face of the disk in an integral manner with the pickup; and head position switching means for moving the magnetic head so as to detach it from the recording face and positioning the magnetic head in either a recordable position or a stand-by position in a selective manner. The disk recording/reproduction device further includes: position retention means for locating the recording medium in a fourth position present between the second position and the third position; the magnetic head moves to the recordable position when the recording medium is in the third position, the magnetic head and the pickup thus recording information on the recording face of the disk; and the magnetic head and the pickup are provided in such a manner as to be capable of moving between a position opposing the protective case of the recording medium and a retracted position away from the position opposing the protective case, and when the recording medium is retained in the fourth position the magnetic head and the pickup are moved from the position opposing the protective case to the retracted position and from the retracted position to the position opposing the protective case.

In one embodiment of the invention, the retracted position of the magnetic head is so set that the magnetic head overlaps with the protective case in the second position when viewed in a direction parallel to the recording face of the disk.

In another embodiment of the invention, a movable range of the pickup achieved by the pickup driving means includes the retracted position.

In still another embodiment of the invention, the loading means includes a case holder moving at least between the second position and the third position with the recording medium being accommodated in the case holder, and a moving path of the magnetic head from the retracted position to the position opposing the protective case is obstructed by the case holder when the recording medium is in the first position and in the second position.

In still another embodiment of the invention, the loading means includes an operation member sliding due to driving force from a loading driving source so as to move the recording medium at least between the second position and the third position, and a moving path of the magnetic head from the position opposing the protective case to the retracted position is obstructed by the operation member when the recording medium is in the third position.

In still another embodiment of the invention, the loading means includes an operation member sliding due to driving force from a loading driving source and a case holder for accommodating the recording medium and moving between the second position and the third position along with the sliding of the operation member, and a moving path of the magnetic head from the retracted position to the position opposing the protective case is obstructed by the operation member when the recording medium is in the first position and in the second position.

In still another embodiment of the invention, the disk recording/reproduction device further includes position detection means for detecting a position of the recording medium and control means for controlling the movement of the magnetic head and the pickup between the position opposing the protective case and the retracted position based on a signal from the position detection means.

In still another embodiment of the invention, the fourth position is so set that a turntable for mounting the disk thereon so as to rotate the disk is inserted in the protective case and that the magnetic head and the pickup are prevented from colliding with the protective case while moving.

In accordance with a disk recording/reproduction device of the present invention, when a recording medium travels from a first position, where ejection of the recording medium is enabled, to a fourth position via a second position, the recording medium is temporarily kept in the fourth position while a pickup and a magnetic head are shifted from a retracted position to a position opposing a protective case of the recording medium. The recording medium then travels from the fourth position to a third position, where recording is enabled, and the disk is chucked onto a turntable, an object lens of the pickup being inserted into the protective case so as to oppose a recording face of the disk with a predetermined interval secured therebetween. In a recording mode, the magnetic head is shifted from a stand-by position to a recording position by a head position switching mechanism so as to be inserted into the protective case, thereby locating the magnetic head so as to oppose the pickup with the disk interposed therebetween. Thus, the pickup and the magnetic head travel in an integral manner parallel to the recording face of the disk and along a radius direction of the disk so as to record information on the disk.

In accordance with the disk recording/reproduction device of the present invention, the magnetic head is not required to travel perpendicularly with respect to the recording face of the disk in order to move out of a loading path, but travels in parallel to the recording face from the position opposing ("opposing position") the protective case to the retracted position away from the opposing position. Thus, the dimensions of the entire device along a thickness direction thereof can be reduced. A configuration can also be adopted in which the magnetic head is always moved in an integral manner with the pickup, so that the reliability of the operation of the device improves. Once the pickup and the magnetic head are adjusted to be positioned so as to oppose each other, their relative positions never change, whereby stable recording characteristics can be provided based on the precise relative positions of the pickup and the magnetic head.

In accordance with the disk recording/reproduction device of the present invention, the thickness of the entire device can be reduced by at least the dimension of a portion of the magnetic head (along the thickness direction) that overlaps with the protective case and a thickness of an interval S shown in FIG. 22A which is required to ensure stable operation of the device. Thus, the thickness of the entire device can be effectively reduced.

By employing a pickup driving mechanism in order to move the pickup from the position opposing the protective case to the retracted position, it becomes unnecessary to provide a separate driving mechanism for moving the magnetic head to the retracted position. By thus employing the pickup driving mechanism for double purposes, the structure of the device can be simplified.

Even if vibration or an impact is applied to the device from the outside, the magnetic head as well as the pickup, is prevented from inadvertently moving out of the position opposing the protective case. Accordingly, the magnetic head and the pickup are prevented from being destroyed owing to an unintended movement thereof.

Since the prevention of the undesirable movement of the magnetic head can be achieved by using constituent elements for loading the recording medium, the structure of the device can be further more simplified.

Since the movement of the magnetic head and the pickup from the retracted position to the position opposing the protective case, or vice versa, can be controlled based on detected positions of the recording medium, the movement the magnetic head and the pickup can be correctly timed. In other words, malfunctions such as the magnetic head or the pickup getting caught by the protective case of the recording medium will be prevented.

By prescribing the fourth position in the closest possible location to the third position, the magnetic head can be positioned in such a manner that the reduction in the thickness of the entire device can be most effectively attained.

Thus, the invention described herein makes possible the advantage of providing a disk recording/reproduction device having a reduced overall thickness and excellent in reliability.

This and other advantages of the present invention will become apparent to those skilled in the art upon reading and understanding the following detailed description with reference to the accompanying figures.

BRIEF DESCRIPTION OF THE DRAWINGS

FIG. 6A is a right-hand side view showing the loading mechanism section of the disk recording/reproduction device shown in FIG. 1.

FIG. 6B is a bottom view showing the loading mechanism section of the disk recording/reproduction device shown in FIG. 1.

FIG. 6C is a cross-sectional view showing the loading mechanism section of the disk recording/reproduction device shown in FIG. 1 taken at line A—A of FIG. 6B.

FIG. 6D is a left-hand side view showing the loading mechanism section of the disk recording/reproduction device shown in FIG. 1.

FIG. 7 is a perspective view showing how the constituent elements of the magnetic head section of the disk recording/reproduction device shown in FIG. 1 are coupled with one another.

FIG. 8 is a perspective view showing how the magnetic head section and a pickup of the disk recording/reproduction device shown in FIG. 1 are coupled with each another.

FIG. 9C shows the states of a second mode detection switch and a third mode detection switch of the disk recording/reproduction device shown in FIG. 1 when a reproducible position during the loading of a recording medium is detected.

FIG. 9D shows the states of a second mode detection switch and a third mode detection switch of the disk recording/reproduction device shown in FIG. 1 when the reproducible position during the unloading of a recording medium is detected.

FIG. 9E shows the states of a second mode detection switch and a third mode detection switch of the disk recording/reproduction device shown in FIG. 1 in recordable position.

FIG. 10A shows the states of an output axis of a loading motor section, an output opening of the loading mechanism, and a stand-by position detection angle of the disk recording/reproduction device shown in FIG. 1 contacting one another, and the state of a fourth mode detection switch in the detachable position.

FIG. 10B shows the states of an output axis of a loading motor section, an output opening of the loading mechanism, and a stand-by position detection angle of the disk recording/reproduction device shown in FIG. 1 contacting one another, and the state of a fourth mode detection switch in the movable position.

FIG. 10C shows the states of an output axis of a loading motor section, an output opening of the loading mechanism, and a stand-by position detection angle of the disk recording/reproduction device shown in FIG. 1 contacting one another, and the state of a fourth mode detection switch in the reproducible position.

FIG. 10D shows the states of an output axis of a loading motor section, an output opening of the loading mechanism, and a stand-by position detection angle of the disk recording/reproduction device shown in FIG. 1 contacting one another, and the state of a fourth mode detection switch in a kicking complete position.

FIG. 15 shows the movement of the loading mechanism and the timing of the switching of various switches of the disk recording/reproduction device shown in FIG. 1.

FIG. 16 is a block diagram showing the configuration of an essential portion of a control system of the disk recording/reproduction device shown in FIG. 1.

DESCRIPTION OF THE PREFERRED EMBODIMENTS

EXAMPLE

Figure 1:
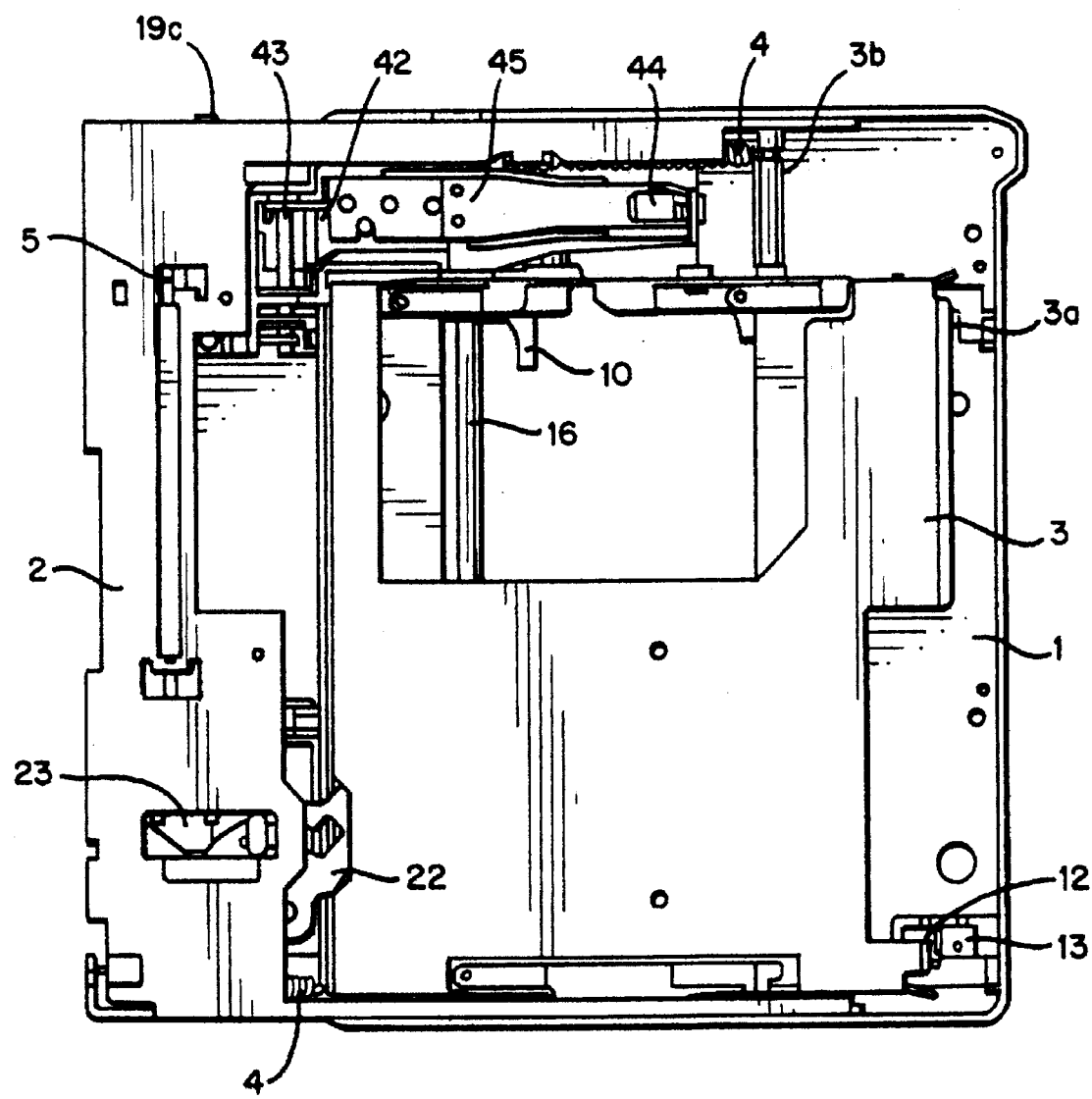
FIG. 1 is a plan view showing a disk recording/reproduction device according to an example of the present invention in a detachable position.

Hereinafter, an example of the present invention will be described with reference to FIGS. 1 to 21. In any one of FIGS. 1 to 21, arrow A indicates a rear direction of the device; arrow B indicates a front direction of the device; arrow C indicates a right-hand side direction of the device as seen from the front; arrow D indicates a left-hand side direction of the device as seen from the front; arrow E indicates an upper direction of the device; arrow F indicates a lower direction of the device; arrow G indicates a clockwise direction when viewing the device from above; arrow H indicates an anticlockwise direction when viewing the device from above; arrow I indicates a clockwise direction when viewing the device from the left side; and arrow J indicates an anticlockwise direction when viewing the device from the left side.

The disk recording/reproduction device accepts a reproduction only medium or a recording/reproduction medium. First, the respective structures of the reproduction only medium and the recording/reproduction medium will be described.

FIG. 20 shows an exemplary configuration of a reproduction only medium. The reproduction only medium is composed essentially of a cartridge (protective case) 49 having a window 49a for an object lens of a pickup and an opening 49c for a turntable and a reproduction only disk 51 accommodated within the cartridge 49. The cartridge 49 includes a shutter 53 capable of sliding in the directions of arrows A and B. The shutter 53 slides in the direction of arrow A so as to cover the window 49a, and in the direction of arrow B so as to open the window 49a and expose the disk 51 to the outside. When the window 49a is in a covered or closed state, that state is maintained by mechanism of a lock lever 53a locking the window 49a. In a lower corner of the cartridge 49, a hole 49b indicating the recording disabled status of the disk is provided.

FIG. 21 shows an exemplary configuration of a recording/reproduction medium. As shown in FIG. 21, the recording/reproduction medium is composed essentially of a cartridge 50 and a recording/reproduction disk 52 accommodated within the cartridge 50. The cartridge 50 has a window 50a for an object lens of a pickup on an lower face thereof, and a window 50b for a magnetic head on a upper face thereof. The cartridge 50 also has an opening 50e on the lower face thereof for a turntable. The cartridge 50 includes a shutter 54 capable of sliding in the directions of arrows A and B. The shutter 54 is provided so as to partially cover both faces of the cartridge 50. The shutter 54 slides in the direction of arrow A so as to cover the windows 50a and 50b, and in the direction of arrow B so as to open the windows 50a and 50b and expose the disk 52 to the outside. When the windows 50a and 50b are in a covered or closed state, that state is maintained by mechanism of a lock lever 54a locking the respective windows 50a and 50b. In a lower corner of the cartridge 50, a hole 50c which is closed (by mechanism of a tab 55 described below) when indicating a write-protected state and a hole 50d for indicating the status or the kind of the disk itself. The cartridge 50 further includes the tab 55 for opening and closing the hole 50c by sliding along a direction perpendicular to the directions of arrows A and B.

Thus, the two kinds of recording media, i.e., reproduction only and recording/reproduction, are discerned by detecting the presence or absence of the hole 50d by mechanism of a disk detection switch (described later). A medium which has the hole 50d is determined to be a recording/reproduction recording medium, whereas a medium which does not have the hole 50d is determined to be a reproduction only medium. The determination as to whether recording is enabled or disabled is performed by detecting the presence or absence of the hole 49b or 50c by mechanism of a write protect detection switch (described later). That is, if either the hole 49b or the hole 50c is detected, any recording operation is prohibited for the medium. On the other hand, if neither the hole 49b nor the hole 50c is detected (by being closed by the tab 55), a recording operation is permitted for the medium.

The above-mentioned disks 51 and 52 have read-in areas 51a and 52a, respectively, in the innermost periphery of a data area thereof. The disks 51 and 52 also have read-out areas 51b and 52b, respectively, in the outermost periphery of the data area thereof. The read-in areas 51a and 52a and the read-out areas 51b and 52b contain pre-recorded information of the respective disks 51 and 52.

Next, the constituent elements of the disk recording/reproduction device according to the present invention will be sequentially described.

Figure 2:
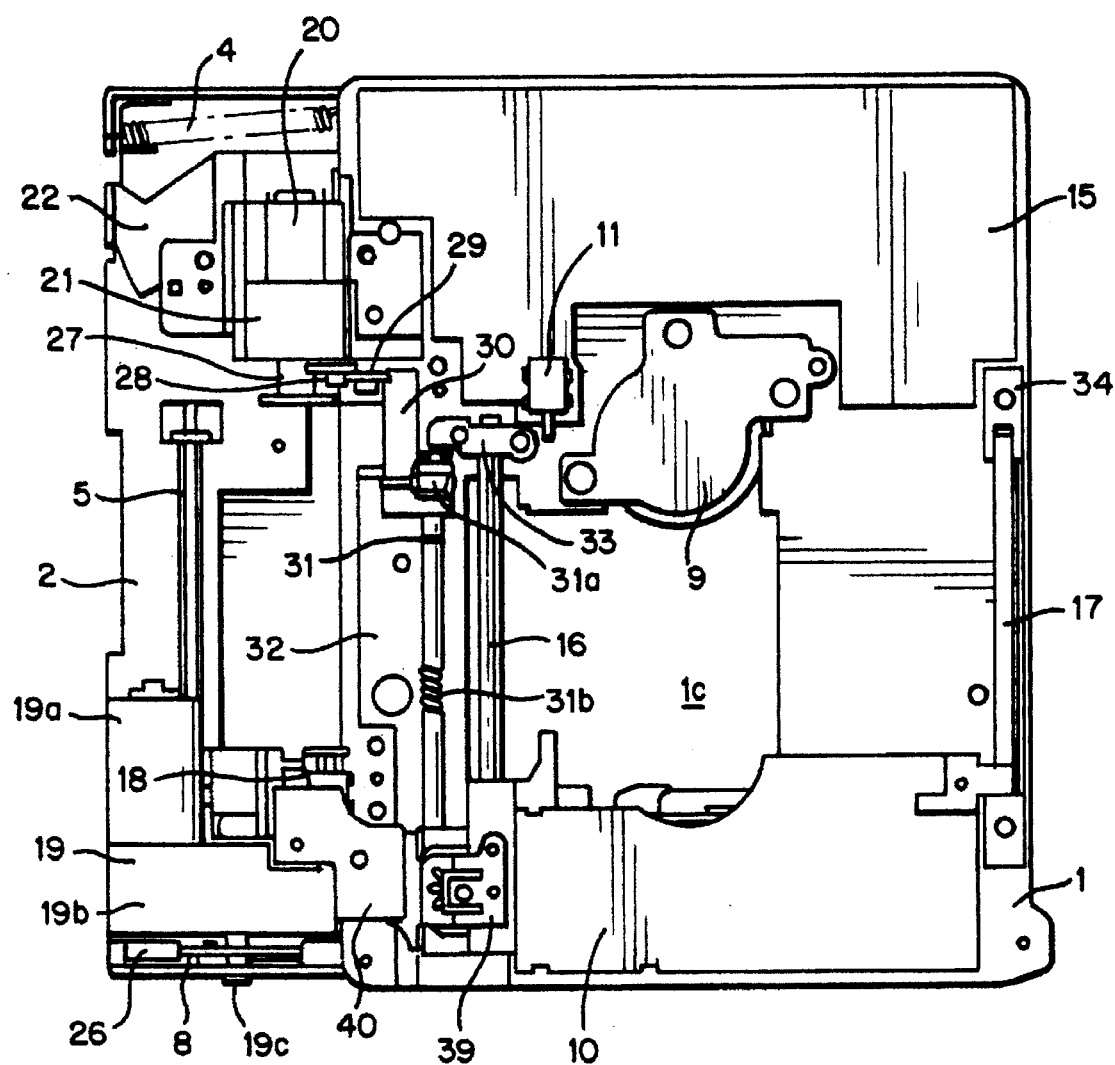
FIG. 2 is a bottom view showing the disk recording/reproduction device shown in FIG. 1.
Figure 3:
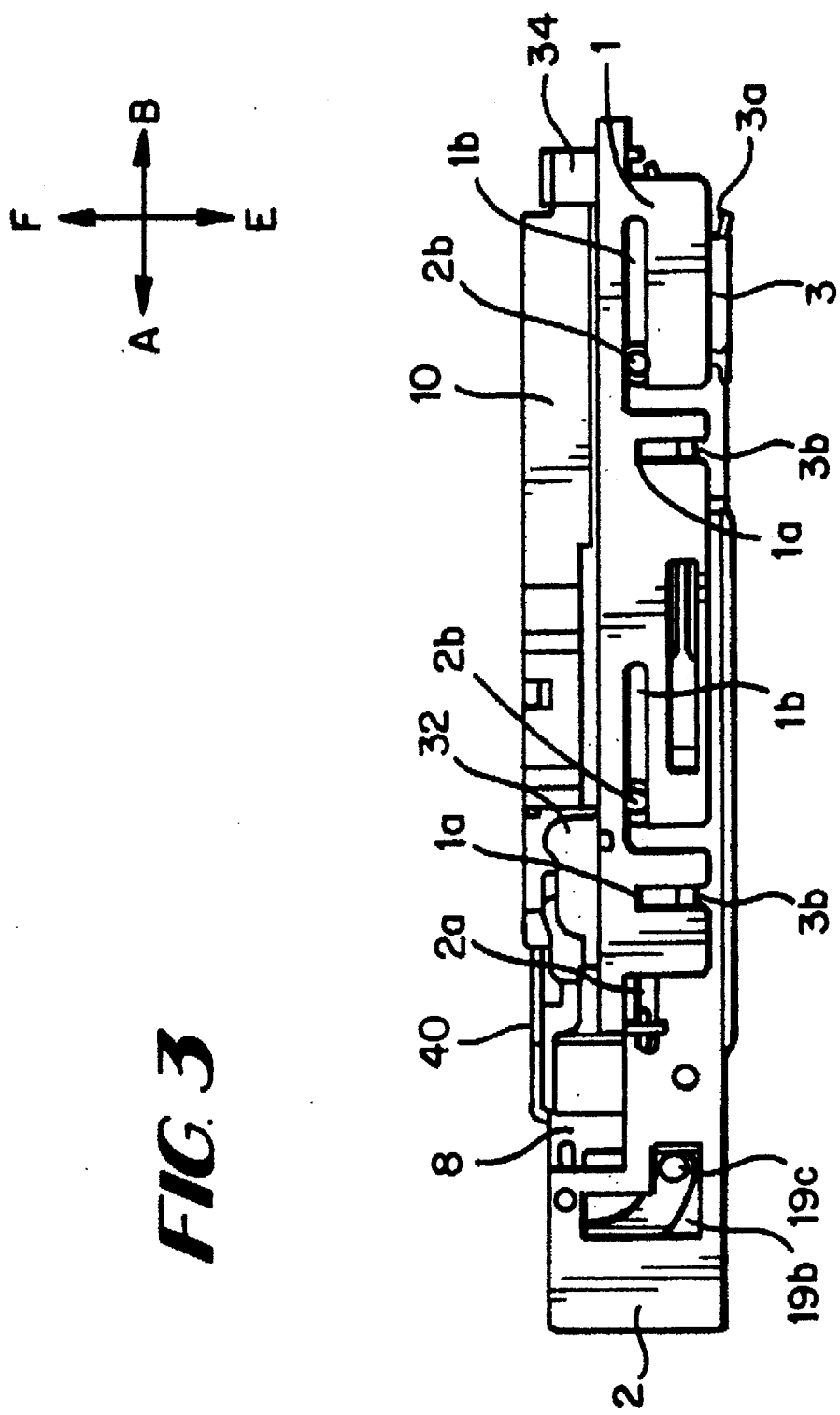
FIG. 3 is a right-hand side view showing the disk recording/reproduction device shown in FIG. 1.
Figure 4:
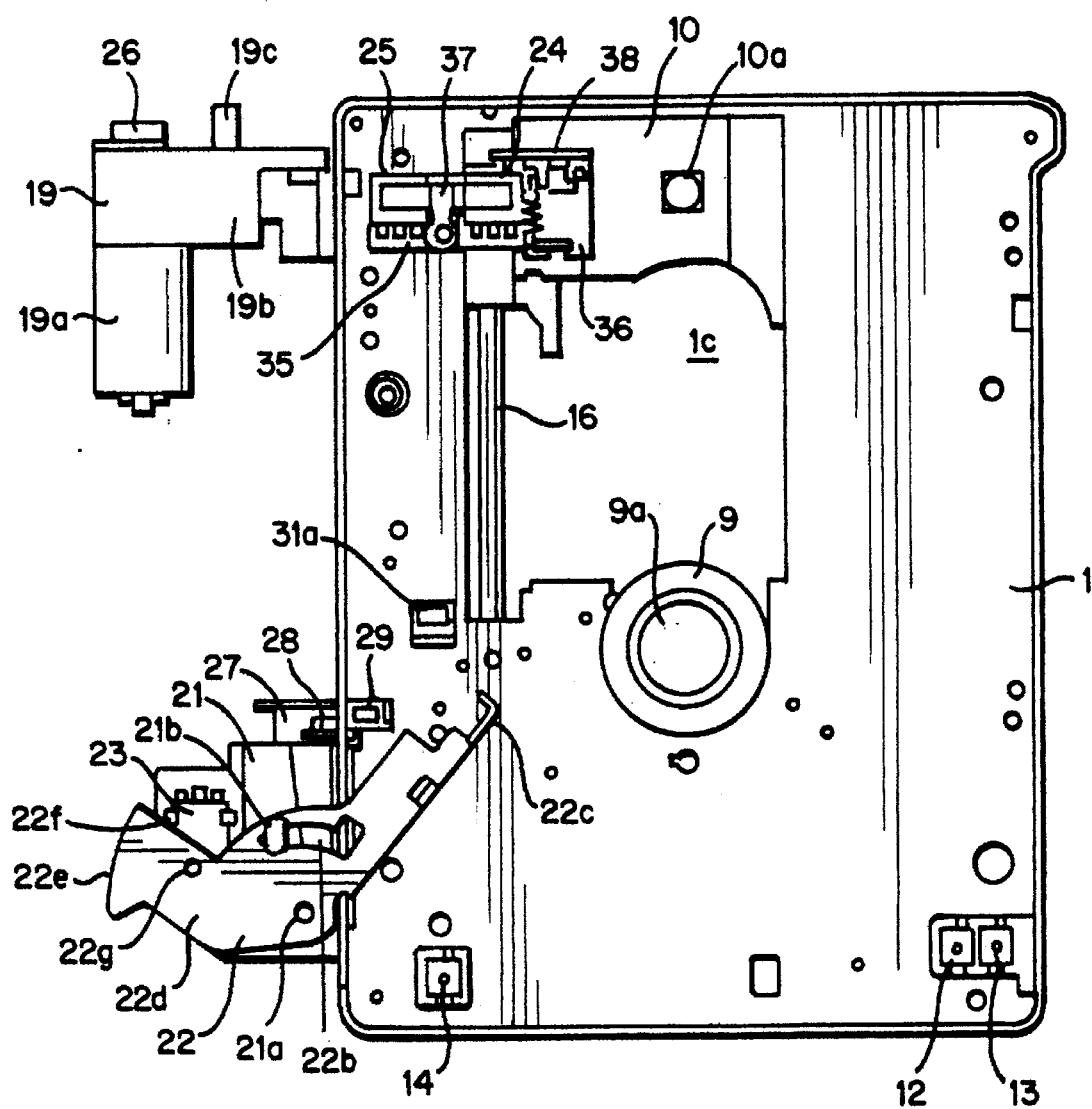
FIG. 4 is a plan view showing the disk recording/reproduction device shown in FIG. 1 without a cartridge holder, a spring for loading purposes, a loading mechanism section, and a magnetic head section.

FIG. 1 is a plan view showing a detachable position of the disk recording/reproduction device according to one example of the present invention. FIG. 2 is a bottom view of FIG. 1. FIG. 3 is a right-hand side view of FIG. 1. FIG. 4 is a plan view showing the device shown in FIG. 1 without a cartridge holder, a spring for loading purposes, a loading mechanism section, and a magnetic head section thereof.

Figure 5:
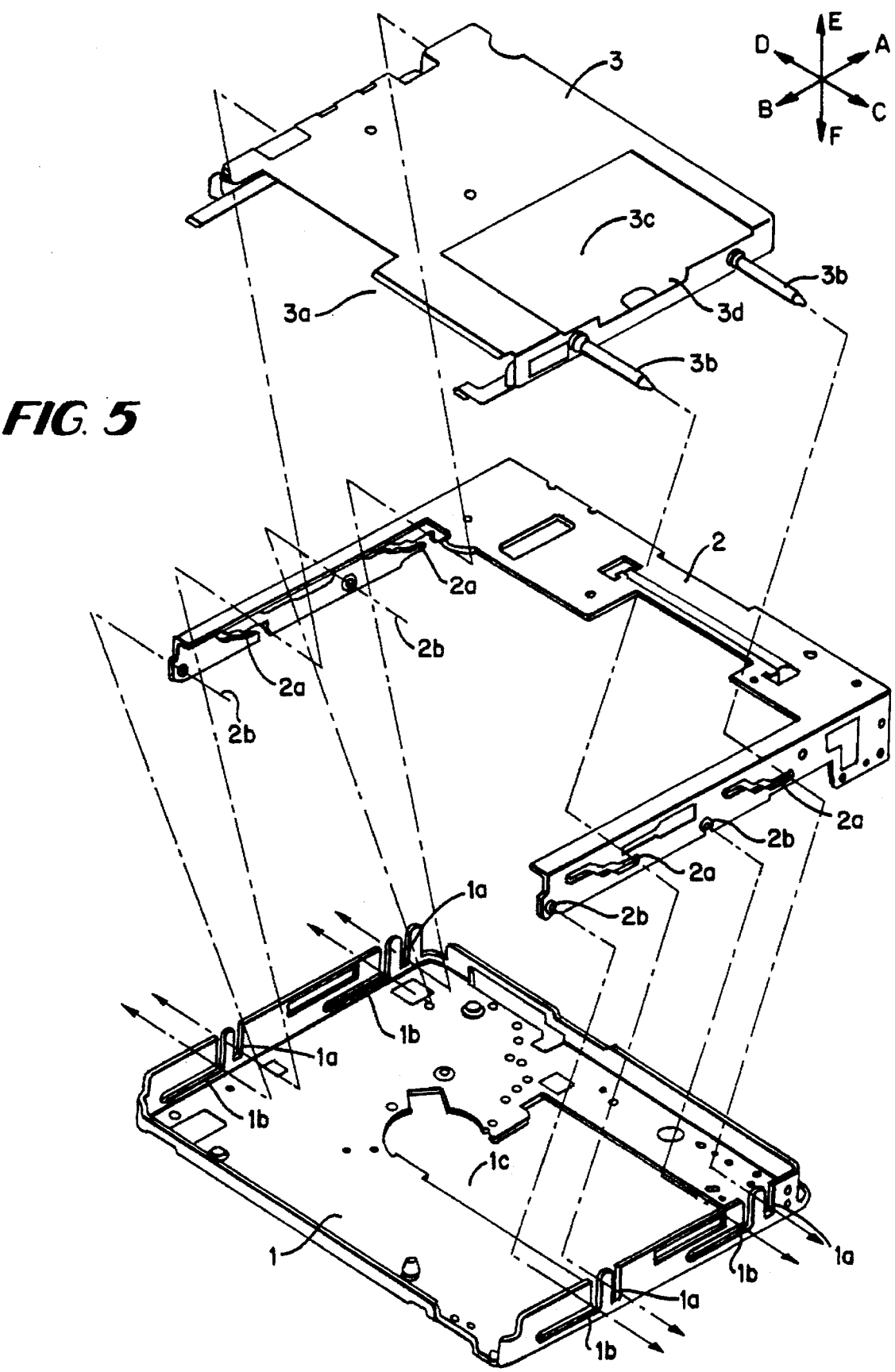
FIG. 5 is a perspective view showing how the cartridge holder, the loading mechanism section, and a main chassis are coupled with one another.
Figure 9B:
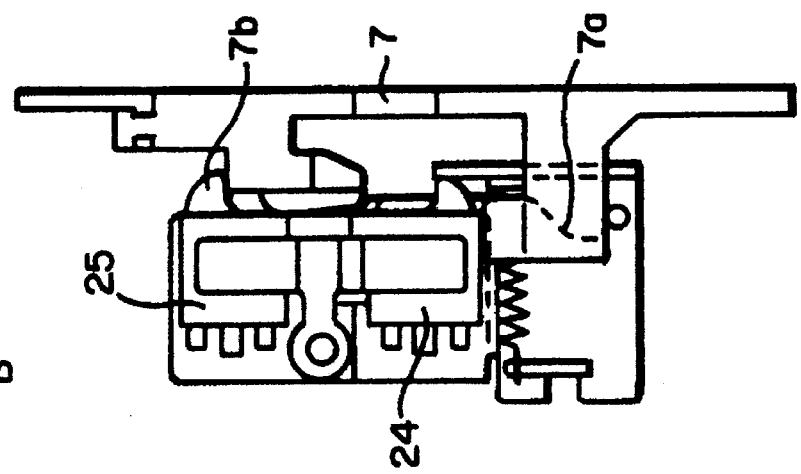
FIG. 9B shows the states of the second mode detection switch and the third mode detection switch of the disk recording/reproduction device shown in FIG. 1 when a movable position during the loading of a recording medium is detected.
Figure 9A:
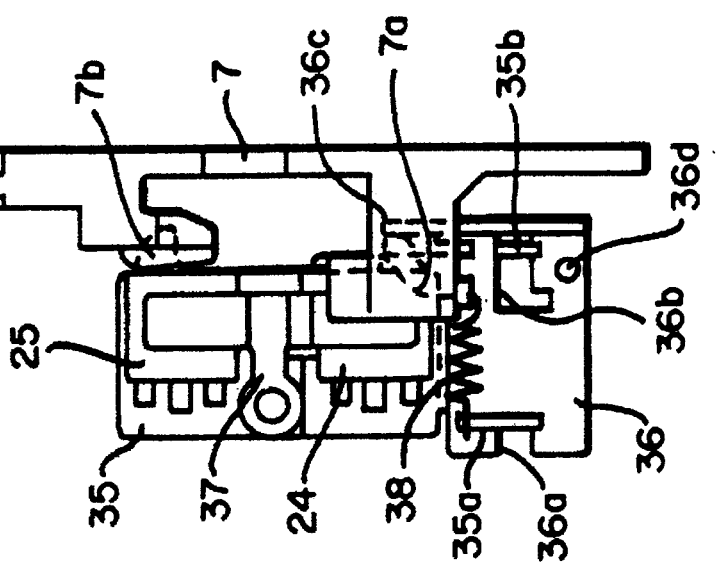
FIG. 9A shows the states of a second mode detection switch and a third mode detection switch of the disk recording/reproduction device shown in FIG. 1 in the detachable position.

First, the respective configurations and coupling relationships of a main chassis 1, a loading mechanism (movement mechanism) 2, and a cartridge holder (case holder) 3 will be described with reference to FIGS. 1 to 5; FIG. 5 being an exploded perspective view showing how these constituent elements are coupled with one another.

As shown in FIG. 5, the main chassis 1 includes an opening 1c on a bottom face thereof, the opening having an appropriate size in view of the attachment of a turntable (described later) and a spindle motor for rotating the turntable and the movement range of a pickup (described later). On each side wall of the main chassis 1, a pair of vertical guide grooves 1a and a pair of L-shaped guide grooves 1b, are provided. The pair of guide grooves 1a are located at a distance from each other along the directions of arrows A and B. An upper end of each guide groove 1a is open in an upper edge of the side wall. Each guide groove 1b is located in front of a corresponding one of the guide grooves 1a. An upper end of a vertical portion of each guide groove 1b is open in the upper edge of the side wall, and a lateral portion of each guide groove 1b extends from a lower end of the vertical portion towards the front.

The loading mechanism 2 includes side wall portions extending along inner faces of the side walls of the main chassis 1 and a bridge portion located between rear ends of upper edges of the side wall portions. Axes 2b projecting outward are provided on the respective side wall portions at a distance with each other, the axes 2b being formed by a drawing process. The axes 2b of the loading mechanism 2 are inserted into the lateral portions of the guide grooves 1b via the vertical portions thereof, whereby the loading mechanism 2 is mounted to the main chassis 1 so as to be capable of freely moving in the directions of arrows A and B. The movable range of the loading mechanism 2 is restricted to be within the range for which the lateral portions of the guide grooves 1b extend. The movable range of the loading mechanism 2 along the directions of arrows E and F is restricted by upper and lower edges of the lateral portions. The vertical portions of the guide grooves 1b are utilized only when the loading mechanism 2 is thus mounted on the main chassis 1, i.e., when inserting the axes 2b into the lateral portions of the guide grooves 1b.

On each side wall portion of the loading mechanism 2, a pair of step-like guide grooves 2a are formed at a distance from each other along the directions of arrows A and B. Each guide groove 2a has an upper step, a middle step, and a lower step formed in this order from the front to the rear, i.e., in the direction of arrow A, respectively. The guide groove 2a formed in the left side wall portion of the loading mechanism 2 is open in a lower edge thereof so as to facilitate the mounting of the cartridge holder 3.

The rear end of the loading mechanism 2 having the above-described configuration, when mounted on the main chassis 1, projects in the direction of arrow A from the main chassis 1.

Side portions of the cartridge holder 3 are bent downward in a U-shape, thus forming an opening 3a in the front for inserting a recording medium. The cartridge holder 3 also has an opening 3c of a size sufficiently large to cover the shutter 50b of a recording/reproduction medium and the movable range thereof when the recording/reproduction medium is held in the cartridge holder 3. The opening 3c has a notch 3d on one end thereof which allows for the movement of a magnetic head (described later).

A pair of stepped pins 3b (each having a smaller diameter portion on a tip thereof and a larger diameter portion defining a base for the smaller diameter portion) are provided on the right side face of the cartridge holder 3 at a distance from each other along the directions of arrows A and B. The smaller diameter portions of the stepped pins 3b are inserted into the guide grooves 1a of the main chassis 1 via the guide grooves 2a of the loading mechanism 2. A pair of pins (not shown) provided on the left side face of the cartridge holder 3 are inserted into the guide grooves 1a of the main chassis 1 via the guide grooves 2a of the loading mechanism 2. The reason for employing the stepped pins 3b is to provide a space for retracting the magnetic head (described later) and the pickup (described later) between the right side face of the cartridge holder 3 and the right side wall portion of the loading mechanism 2.

Thus, the cartridge holder 3 is prevented from moving in the directions of arrows A and B because the pins 3b are inserted in the guide grooves 1a, and is allowed to move only in the directions of arrows E and F. The vertical movements of the cartridge holder 3 are achieved by the engagement of the pins 3b and the guide grooves 2a accompanying a sliding movement of the loading mechanism 2. As shown in FIG. 2, a spring 4 for loading purposes is installed between the respective rear ends of the loading mechanism 2 and the cartridge holder 3 in an expanded state. Since the cartridge holder 3 is prohibited from moving in the direction of arrows A and B, the spring 4 is loaded so as to move the loading mechanism 2 in the direction of arrow B.

FIGS. 6A to 6D show a section constructed around the loading mechanism 2 (loading mechanism section). FIG. 6A shows a right-hand side view. FIG. 6B shows a bottom view. FIG. 6C shows a cross section taken at A—A in FIG. 6B. FIG. 6D shows a left-hand side view.

In FIGS. 6B and 6C, reference numeral 5 denotes a head movement shaft 5 having a length corresponding to the movable range of the magnetic head. The head movement shaft 5 contributes to the switching of the position of the magnetic head. The head movement shaft 5 is attached on a lower face of the bridge portion of the loading 2 in such a manner that an axis direction thereof is parallel to the directions of arrows C and D. Specifically, the head movement shaft 5 is attached on the bridge portion by inserting one end thereof in a hole of a bent member 2c formed in a cut-and-raise manner on the bridge portion and fixing the other end on the bridge portion by mechanism of a movement shaft angle 6. The movement shaft angle 6 is inserted in a slit in the bridge portion at one end, and the other end of the movement shaft angle 6 is fixed on the bridge portion with a screw or the like.

A switch movement angle 7 is attached to a predetermined position on the inner face of the right side wall portion of the loading mechanism 2. The switch movement angle 7 includes a bent portion 7c bent inward from an upper edge thereof and having a substantial U-shape and a lever portion 7b bent inward from a lower edge thereof so as to be horizontal. A side edge of a tip portion of the bent portion 7c facing the direction of arrow B is formed on a slanted face 7a. The bent portion 7c and the lever portion 7b are disposed at a distance from each other both along the direction of arrows A and B and the direction of arrows E and F.

A stand-by position detection angle 8 has a substantial S-shape and has guide grooves 8c extending along the direction of arrows A and B. The stand-by position detection angle 8 is supported so as to be capable of sliding along the side wall portions of the loading mechanism 2 because of pins 2d formed on the inner face of the right side wall portion of the loading mechanism 2 and inserted in the guide grooves 8c. The stand-by position detection angle 8 is made ready to move in the direction of arrow A by a loaded spring (not shown).

The loading mechanism 2 forms an opening 2e for output purposes where the loading mechanism 2 overlays the stand-by position detection angle 8. The opening 2e has a substantial L-shape. A side edge 8a of the stand-by position detection angle 8 is located so as to cross the opening 2e. The loading mechanism 2 further includes a bent portion 2f projecting downward from a rear end of the bridge portion in the vicinity of the left side wall portion.

Next, a loading motor section 19 will be described with reference mainly to FIGS. 2 and 4. The loading motor section 19 is attached on a lower face of the main chassis 1 at a right-rear end thereof. The loading motor section 19 includes a loading motor 19a, a gear section 19b, and an output axis 19c. The output axis 19c rotates so as to trace a semicircular trajectory. The output axis 19c is inside the output opening 2e of the loading mechanism 2. The driving force of the loading motor 19a is transmitted to the loading mechanism 2 by the rotation of the output axis 19c. Moreover, the deceleration ratio of the gear section 19b is set very high so as to greatly reduce the rotation number per unit of the loading motor 19a. Accordingly, the output axis 19c never rotates owing to an extrinsic load. A fourth mode detection switch 26 is provided on a right side of the gear section 19b. The switch 26 is located in such a position that the switch 26 is turned on and off by the side edge 8a of the stand-by position detection angle 8 as the stand-by position detection angle 8 slides back and forth.

Next, an ejection mechanism of the disk recording/reproduction device will be described with reference mainly to FIG. 4.

As shown in FIG. 4, an ejection lever 22 is supported, so as to be capable of rotating in the direction of arrows G and H, by a pole 21a projecting from a feed motor angle 21 attached on the lower face of the main chassis 1 at a left-rear end thereof. The rotatable range of the ejection lever 22 is restricted by an arc-shaped guide groove 22b of the ejection lever 22 and a tab 21b inserted into the guide groove 22b and projecting from the feed motor angle 21. The ejection lever 22 is made ready to move in the direction of arrow G by a loaded spring (not shown). The ejection lever 22 has a kicking portion 22c for kicking out a recording medium. The kicking portion 22c can protrude to or retract from a surface of the main chassis 1 by rotating. The kicking portion 22c normally projects on the surface of the main chassis 1 owing to the above-mentioned loaded spring.

The ejection lever 22 includes an arm portion 22d projecting toward its rear end. On the end of the arm portion 22d, an arc-shaped edge 22e is formed. An end edge 22f linearly extends in the radius direction of the arc and continuously from one end of the arc-shaped edge 22e.

When the action of the spring has rotated the ejection lever 22 in the direction of arrow G to the farthest extent, the loading mechanism 2 is kept in a rear position (i.e., in the direction of arrow A) owing to the abutment of the arc-shaped edge 22e and the bent portion 2f, against the action of the spring 4 for loading purposes. When the kicking portion 22c rotates in the direction of arrow H, against the action of the spring associated therewith, and the kicking portion 22c has retracted from upon the main chassis 1, the abutment of the arc-shaped edge 22e and the bent portion 2f breaks, thereby allowing the loading mechanism 2 to move in the direction of arrow B owing to the action of the loaded spring 4. In this state, the ejection lever 22 is prevented from rotating in the direction of arrow G by the abutment of the end edge 22f and the bent portion 2f.

A first mode detection switch 23 is provided on the feed motor angle 21. The first mode detection switch 23 is turned on by a pin 22g projecting on the back side of the ejection lever 22 when the ejection lever 22 has rotated in the direction of arrow G to the farthest extent.

Next, a disk driving mechanism, the pickup and a driving mechanism thereof, the magnetic head section, and the like will be described.

As shown in FIGS. 2 and 4, the disk driving mechanism includes a spindle motor 9 and a turntable 9a integrally formed with the spindle motor 9. A disk will be chucked onto the turntable 9a. The spindle motor 9 is attached on the lower face of the main chassis 1 substantially in the center. The turntable 9a is disposed on the upper face of the main chassis 1 through the opening 1c thereof.

As shown in FIG. 4, the pickup 10 has an object lens 10a formed in a central portion of an upper face thereof. As well known in the art, the pickup 10 has internalized therein a semiconductor laser as a light source, an optical system for leading laser light emitted from the semiconductor laser into the object lens 10a, a light sensitive element, an optical system for leading light returning from the object lens 10a (i.e., light reflected from the disk) into the light sensitive element, a focusing/tracking controlling elements, and the like. The pickup 10 is supported by two guide shafts 16 and 17 provided on the main chassis 1, the pickup 10 being so supported as to be parallel to a recording face of a disk and capable of sliding along the radius direction of the disk. The guide shaft 16 is attached on the lower face of the main chassis 1 by mechanism of a guide receptacle 33 and an axis receptacle 32. The guide shaft 17 is attached on the lower face of the main chassis 1 by mechanism of a guide receptacle 34 and an axis receptacle 35. The guide shafts 16 and 17 are disposed at a distance from each other along the direction of arrows C and D and in parallel to each other.

The movable range of the pickup 10 is normally required to be just large enough for the pickup 10 to be able to read out information carried by a disk. However, according to the present example, the guide shafts 16 and 17 are elongated so as to allow the pickup 10 to move in a larger area. As a result, the pickup 10 is capable of moving from a position opposing the cartridge of a recording medium away to a retracted position.

As shown in FIG. 2, the pickup driving mechanism is composed essentially of a driving grip 39 attached on a rear end of the pickup 10, a driving screw 31, a feed motor 20 attached on a back side of the feed motor angle 21, and a group of gears, i.e., a motor gear 27, gears 28, 29, and 30, and a gear portion 31a of the driving screw 31. The driving screw 31 is provided on the lower face of the main chassis 1 by mechanism of axis receptacles so as to be parallel to the guide shafts 16 and 17. The driving grip 39 engages with a threaded portion 31b of the screw 31. The driving force of the feed motor 20 is transmitted to the driving screw 31 via the group of gears 27, 28, 29, 30, and 31a. The rotation of the driving screw 31 causes the pickup 10 to slide in the direction of arrows C and D. The direction of the sliding of the pickup 10 is determined by the direction of rotation of the feed motor 20.

As shown in FIGS. 7 and 8, the magnetic head section is composed essentially of a head base angle 40, a retraction angle 41, a head attachment angle 42, a magnetic head 44, a head attachment lever 45, a retraction adjustment angle 46, and the like. The head base angle 40 is fixed on the rear end of the pickup 10 at an attachment face 40c.

The head base angle 40 includes an upright portion which is vertically bent from the attachment face 40c. The upright portion includes a center wall 40f and side walls 40g and 40h, thus forming a substantially U-shaped transverse cross section. The center wall 40f has a screw hole 40i. The side wall 40g has a hole 40a in an upper portion thereof, and a manipulation portion 40e in a lower portion thereof. The side wall 40h has a hole 40b in a position opposing the hole 40a, the hole 40b having a smaller diameter than that of the hole 40a. Top ends 40d of the side walls 40g and 40h are so designed as to be the highest portions of the magnetic head section assembly.

The retraction angle 41 and the head attachment angle 42 are attached to the head base angle 40 by mechanism of a pivot axis 43 so as to be capable of separately rotating in the direction of arrows I and J. The pivot axis 43 is sequentially inserted through the hole 40a in the side wall 40g, a hole 41a in the retraction angle 41, holes 42a and 42b in the head attachment angle 42, and a hole 41b of the retraction angle 41. Then, a smaller axis portion 43a of the pivot axis 43 is inserted into the hole 40b in the head base angle 40 so as to be fixed by a detachment prevention mechanism (not shown). Each of the retraction angle 41 and the head attachment angle 42 is made ready to move in the direction of arrow I by a loaded member (not shown), e.g., a spring.

The head attachment lever 45 includes a spring portion 45a, an attachment portion 45b and a suppression portion 45c. The attachment portion 45b is fixed onto the head attachment angle 42 by mechanism of a screw or the like. The spring portion 45a serves to maintain a constant contact pressure when the magnetic head 44 is in a recordable position in which the magnetic head 44 contacts a disk. The suppression portion 45c prevents the magnetic head 44 from travelling excessively upward.

The retraction angle 41 has an abutting portion 41d which abuts the spring portion 45a of the head attachment lever 45 from below at the farther end thereof in the direction of arrow B. The retraction angle 41 has a base portion 41e at the other end, i.e., the end in the direction of arrow A. Two pins 41c project from an upper face of the base portion 41e. The retraction adjustment angle 46 has a hole in which the pins 41c are inserted, so that the retraction adjustment angle 46 is capable of sliding along the direction of arrows E and F. The retraction adjustment angle 46 is made ready to move by a loaded member (not shown). The position of the retraction adjustment angle 46 along the directions of arrows E and F is adjusted by means of a retraction adjustment screw 47 screwed into the base portion 41 and the above-mentioned loaded member. An abutting face 46a is provided in an upper portion of the retraction adjustment angle 46. The abutting face 46a abuts with the loading mechanism 2 or the head movement shaft 5 attached thereto, whereby the position of the retraction adjustment angle 46 is restricted in the direction of arrow I.

The head adjustment screw 48 is screwed into the screw hole 40i in the center wall 40f of the head base angle 40. The first end of the head adjustment screw 48 abuts with the head attachment angle 42, whereby the position of the head attachment angle 42 is restricted in the direction of arrow I.

The magnetic head section has the above-described configuration. FIG. 8 illustrates the magnetic head 44 in a stand-by state. The stand-by state is characterized by the abutting portion 41d (in the direction of arrow B) of the retraction angle 41 being in contact with the spring portion 45a of the magnetic head attachment lever 45, and the spring portion 45a and the magnetic head 44 being lifted up as shown in FIG. 8. On the other hand, in a contact state, i.e., in a recordable position, the abutting portion 41d is no longer in contact with the spring portion 45a because the retraction angle 41 rotates in the direction of arrow I (described in detail in the description of the operation). The adjustment of the height of the magnetic head 44 is made with the retraction adjustment screw 47 in a stand-by state, and with the head adjustment angle 48 in a recordable position.

The magnetic head section having the above configuration is fixed at the attachment face 40c of the head base angle 40 and the rear end (i.e., the end in the direction of arrow A) of the pickup 10 in such a manner that the object lens 10a of the pickup 10 opposes the magnetic head 44. As a result, the pickup 10 and the magnetic head 44 are moved in an integral manner, the pickup 10 and the magnetic head 44 accurately opposing each other.

As shown in FIG. 2, a mechanism substrate 15 is attached on the lower face of the main chassis 1 in an area extending beyond the spindle motor 9 in the direction of arrow D. A read-in detection switch 11 is provided on a lower face of the mechanism substrate 15. As shown in FIG. 4, a disk detection switch 12, a write protect detection switch 13, and a cartridge detection switch 14 for detecting the presence or absence of a recording medium are provided on an upper face of the mechanism substrate. The disk detection switch 12, the write protect detection switch 13, and the cartridge detection switch 14 are exposed on the upper face of the main chassis 1 as shown in FIG. 4. As shown in FIG. 2, a retracted position detection switch 18 is attached on the main chassis 1 away from the read-in detection switch 11. The switch 18 is turned on by the manipulation portion 40e of the head base angle 40 when the pickup 10 and the magnetic head section have moved to the farthest extent in the direction of arrow C.

As shown in FIG. 4, on the right-rear end of the upper face of the main chassis 1, a switch base angle 35 is provided. A second mode detection switch 24 and a third mode detection switch 25 are fixed on the switch base angle 35 by mechanism of a switch holder 37. The configuration of this portion will be described in more detail with reference to FIG. 9. The switch base angle 35 has bent portions 35a and 35b provided at an end in the direction of arrow B. The bent portions 35a and 35b are inserted into a concave portion 36a and a guide hole 36b of the switch angle 36, respectively, whereby the switch angle 36 is attached so as to be capable of sliding in the direction of arrows C and D and ready to move in the direction of arrow D because of the spring 38. The switch angle 36 has an arm portion 36c and a pin 36d. The arm portion 36c switches the second mode detection switch 24. The pin portion 36d is so positioned as to be capable of abutting with the slanted face 7a of the switch movement angle 7. The second mode detection switch 24 and the third mode detection switch 25 are so positioned as to be capable of being switched by the lever portion 7b of the switch movement angle 7.

Hereinafter, an exemplary configuration of a control system of the disk recording/reproduction device according to the present example will be described with reference to FIG. 16.

The control system of the disk recording/reproduction device includes a main control circuit 57. The main control circuit 57 receives the outputs of: an operation instruction signal source 56 for receiving the respective instructions to record, reproduce, stop, and unload; the first mode detection switch 23, the second mode detection switch 24, the third mode detection switch 25, and the fourth mode detection switch 26 for controlling the turning on and off of the loading motor 19a; the disk detection switch 12 for detecting either one of the above-mentioned two kinds of disks; the write protect detection switch 13 for detecting that an inserted disk does not allow the information contained thereon to be rewritten; the cartridge detection switch 14 for detecting the insertion of a cartridge; the read-in detection switch 11 for detecting that the pickup 10 and the magnetic head 44 are positioned in the innermost periphery of the disk; and the retracted position detection switch 18 for detecting that the pickup 10 and the magnetic head 44 are positioned in the retracted position.

Figure 17:
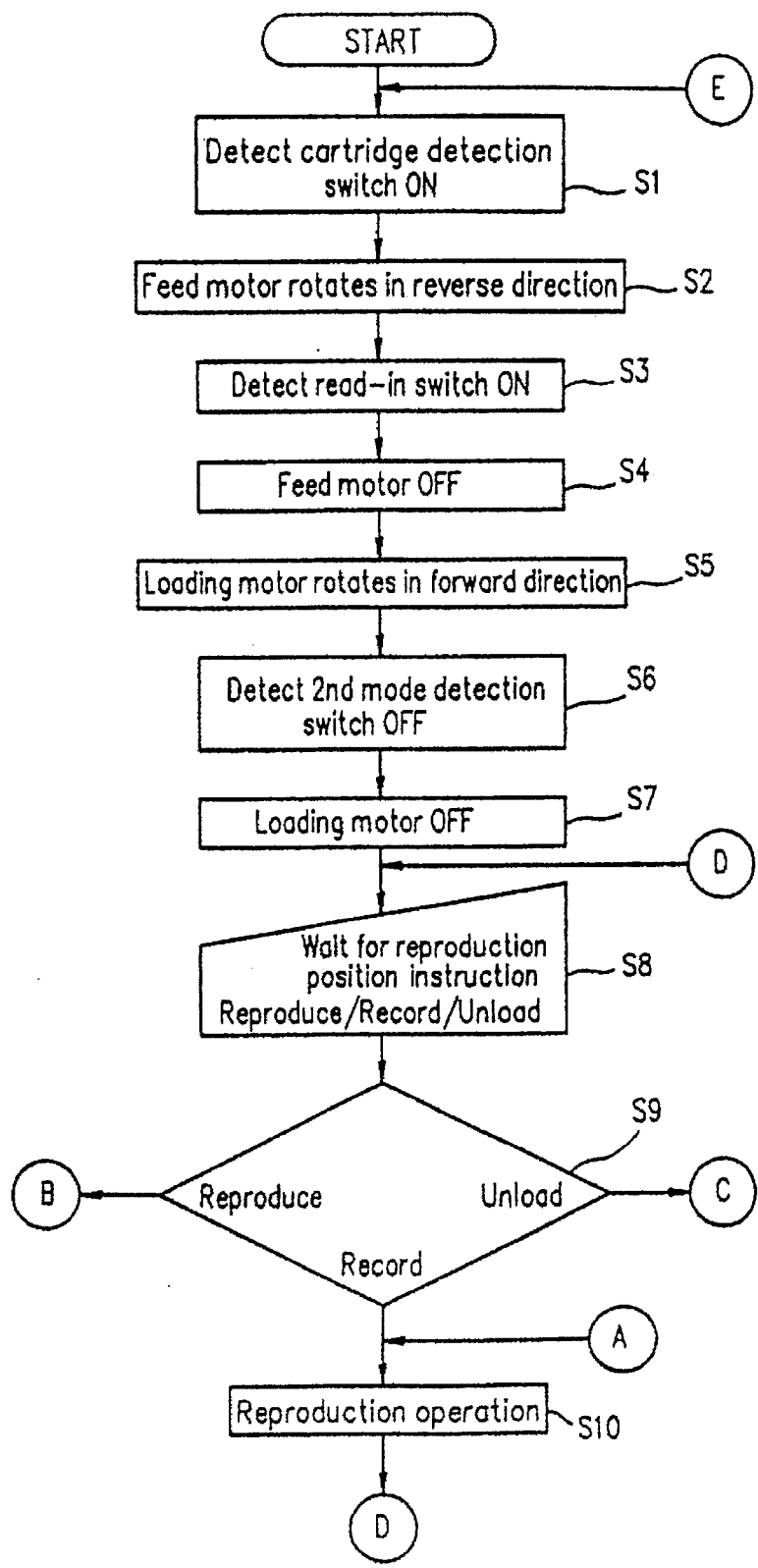
FIG. 17 is a flowchart showing an operation of the disk recording/reproduction device shown in FIG. 1 after a cartridge has been inserted.
Figure 18:
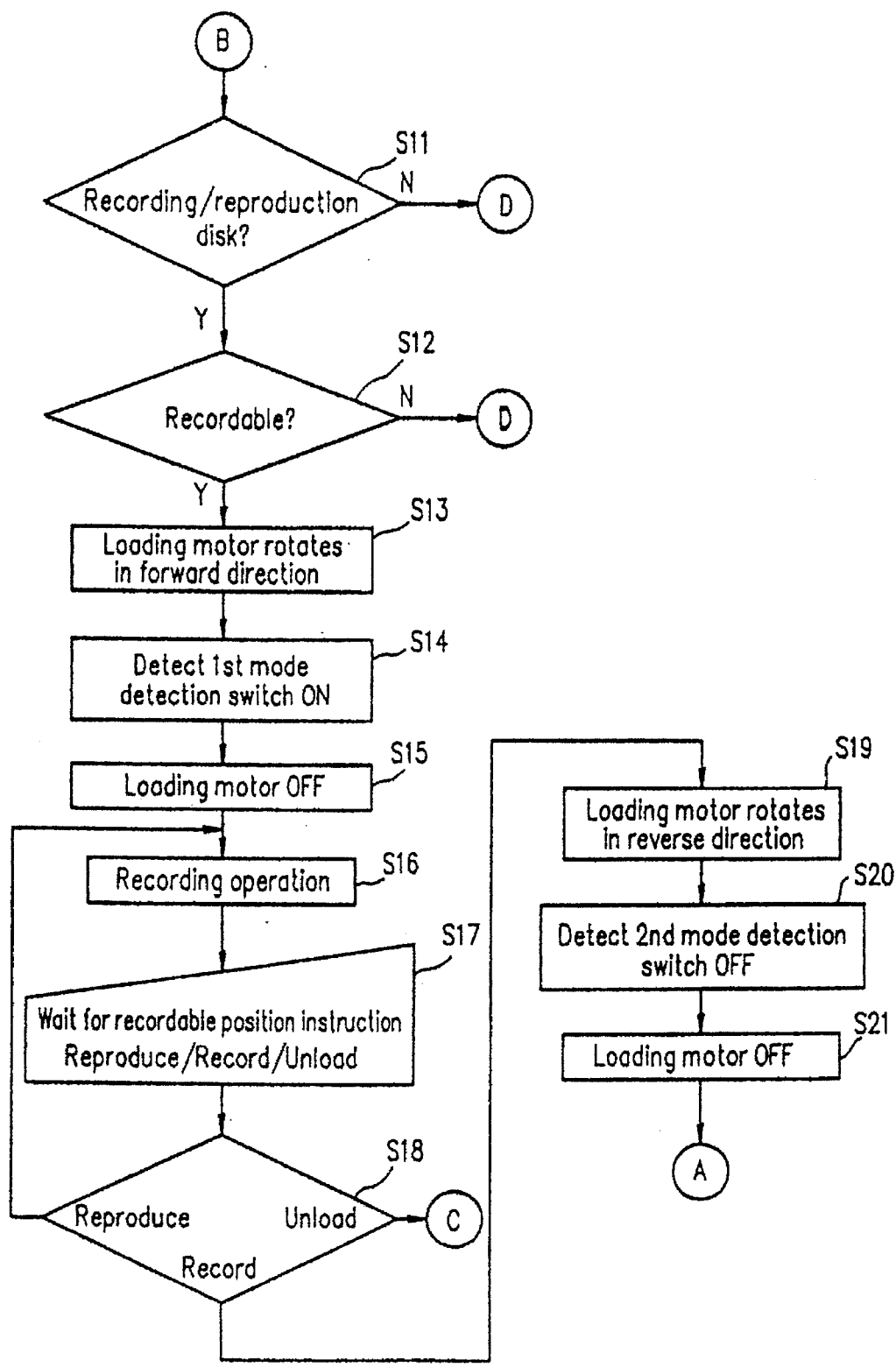
FIG. 18 is a flowchart showing an operation of the disk recording/reproduction device shown in FIG. 1 following the flowchart of FIG. 17.
Figure 19:
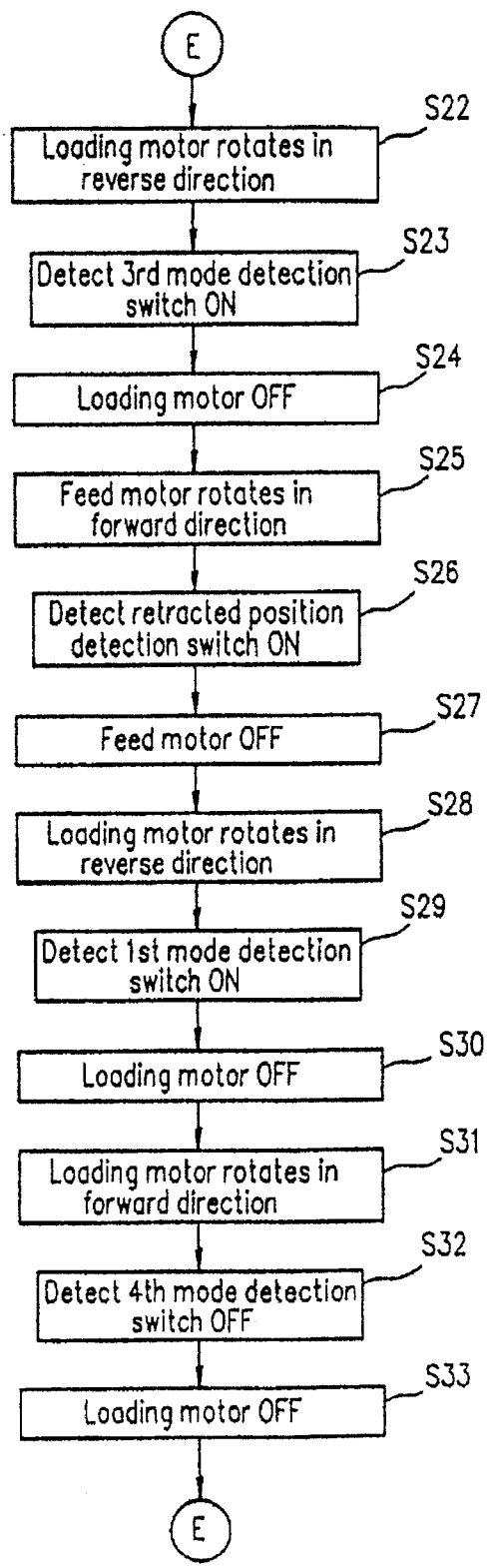
FIG. 19 is a flowchart showing an operation of the disk recording/reproduction device shown in FIG. 1 following the flowcharts of FIGS. 17 and 18.
Figure 20C:
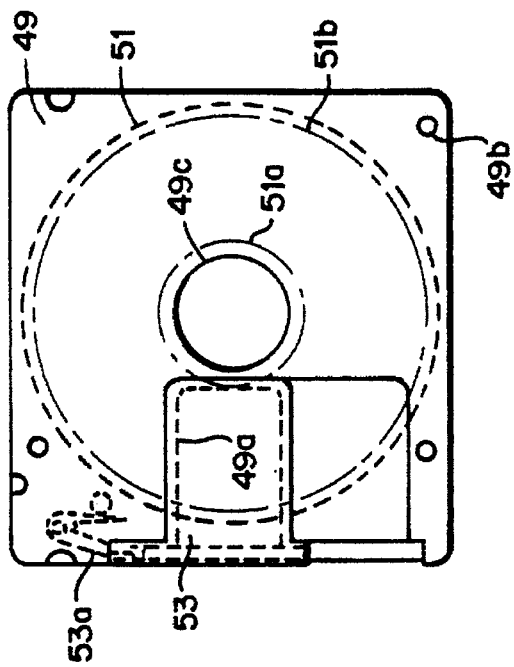
FIG. 20C is a bottom view showing a reproduction only recording medium.
Figure 20B:
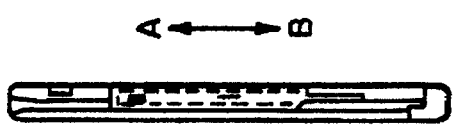
FIG. 20B is a side view showing a reproduction only recording medium.
Figure 20A:
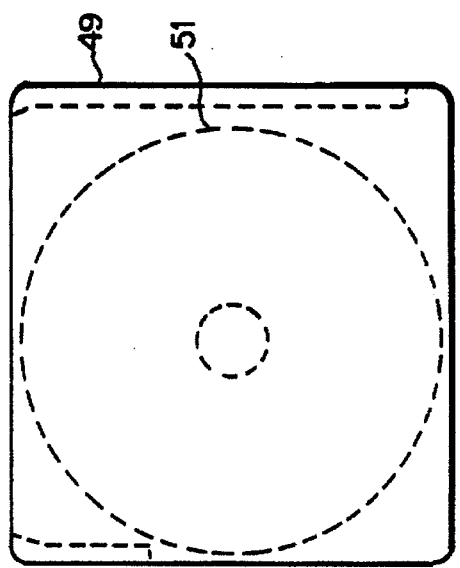
FIG. 20A is a plan view showing a reproduction only recording medium.
Figure 20D:
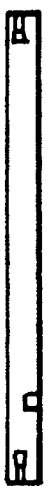
FIG. 20D is a front view showing a reproduction only recording medium.
Figure 21C:
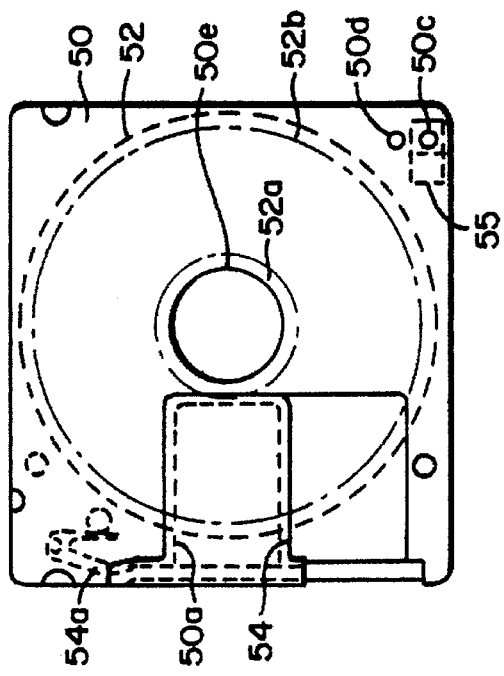
FIG. 21C is a bottom view showing a recording/reproduction medium.
Figure 21B:
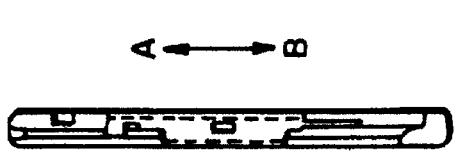
FIG. 21B is a side view showing a recording/reproduction medium.
Figure 21D:
FIG. 21D is a front view showing a recording/reproduction medium.
Figure 21A:
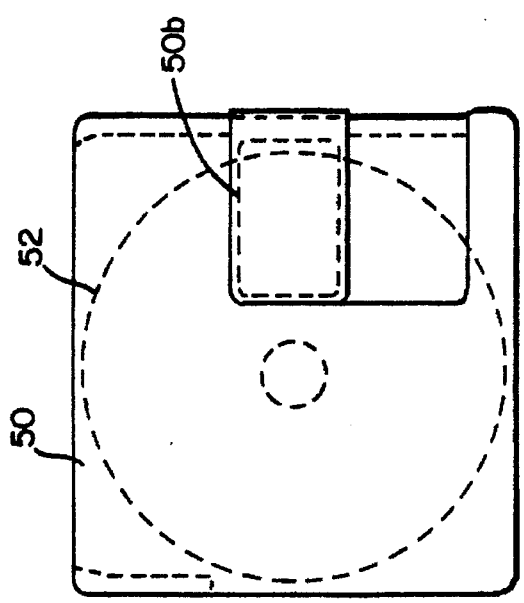
FIG. 21A is a plan view showing a recording/reproduction medium.

Based on the above inputs, the control system performs control as shown in the flowchart of FIGS. 17 to 19 for the pickup 10 for recording information on and reproducing information from a disk by radiating a light beam on the disk, the magnetic head 44 for applying a magnetic field on a portion of the disk that is irradiated with the light beam, a driving circuit 58 for driving the feed motor 20, a driving circuit 59 for driving the loading motor 19a, and a driving circuit 60 for driving the spindle motor 9.

Hereinafter, the operation of the disk recording/ reproduction device according to the present example will be described.

Figure 12:
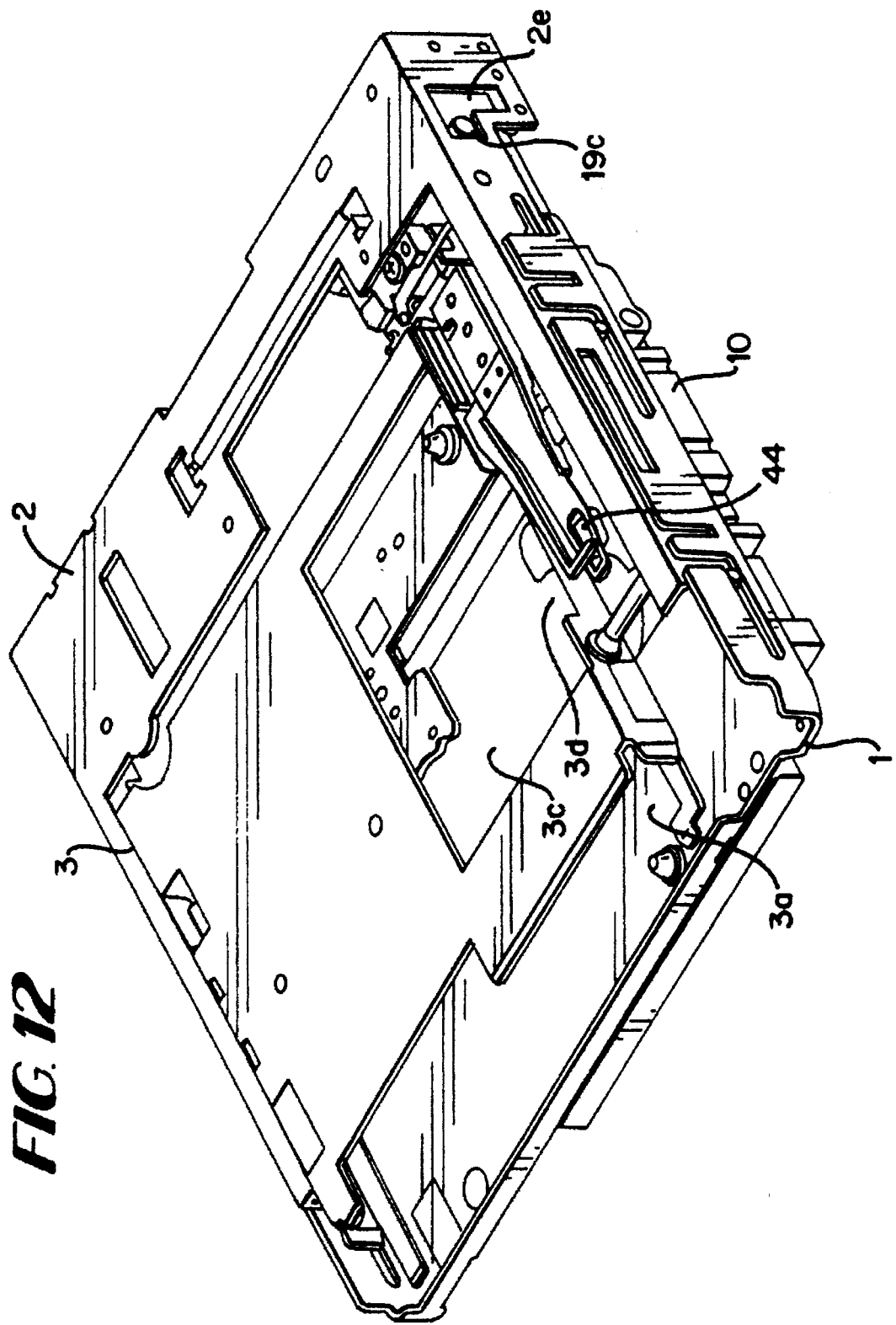
FIG. 12 is a perspective view showing main constituent elements of the disk recording/reproduction device shown in FIG. 1 in the detachable position.

First, the states of the respective constituent elements in the detachable position will be described. In this position, the section including the pickup 10 and the magnetic head 44 has traveled to the farthest extent in the direction of arrow C. As shown in FIGS. 1, 2, and 12, the section is positioned in a space that is secured between the loading mechanism 2 and the cartridge holder 3 by mechanism of the stepped pins 3a. In this state, the magnetic head 44 is in the retracted position, away from the position opposing the cartridge of the recording medium. The loading mechanism 2 has slid to the farthest extent in the direction of arrow A, against the action of the spring 4 for loading purposes, due to the abutment of the bent portion 2f and the arc-shaped edge 22e of the ejection lever 22, which has rotated to the farthest extent in the direction of arrow G. As a result of this, the cartridge holder 3 is at the farther end in the direction of arrow E, with each pin 3a being in the uppermost portion of the guide groove 2a in the corresponding side wall portion of the loading mechanism 2.

The retracted position detection switch 18 is turned on by the manipulation portion 40e of the head base angle 40. The first mode detection switch 23, the second mode detection switch 24, and the third mode detection switch 25 are turned on. The fourth mode detection switch 26 and the cartridge detection switch 14 in an off-state. As shown in FIG. 10A, the output axis of the loading motor section 19 is not in contact with the edge of the output opening 2e of the loading mechanism 2, but abuts with the side edge 8b so as to press the stand-by position detection angle 8 in the direction of arrow B, against the action of the spring loaded in the direction of arrow A.

If a recording medium is inserted in the direction of arrow A through the opening 3a of the cartridge 3, the rear end face of the cartridge of that recording medium abuts with the kicking portion 22c of the ejection lever 22. This state is defined as the first position, which allows the recording medium to be taken out.

If the recording medium is further pushed in the direction of arrow A from the first position, the kicking portion 22c recedes from upon the main chassis 1 in the direction of arrow H, so that the recording medium reaches the second position, at which the loading of the recording medium is complete. In the course of the loading of the recording medium, the shutter of the recording medium is opened by a shutter opening/closing mechanism (not shown), so that the recording medium is retained in the cartridge holder 3 with the shutter open. As the ejection lever 22 rotates in the direction of arrow H, the first mode detection switch 23 is turned off, free from the manipulation by the pin 22g.

Then, the abutment of the bent portion 2f of the loading mechanism 2 and the arc-shaped edge 22e of the ejection lever 22 breaks, thereby allowing the loading mechanism 2 to be moved in the direction of arrow B owing to the action of the loaded spring 2 for loading purposes. The movement of the loading mechanism 2 in the direction of arrow B stops when the edge 2h of the output opening 2e abuts with the output axis 19c, as shown in FIG. 10B. After the break of the above-mentioned abutment of the bent portion 2f and the arc-shaped edge 22e, the end edge 22f engages with the bent portion 2f so as to prevent the ejection lever 22 from rotating in the direction of arrow G. As a result, the kicking portion 22c is maintained as receded in the rear end of the main chassis 1.

As with the movement of the loading mechanism 2 in the direction of arrow B, the pins 3b shift from the uppermost portions of the guide grooves 2a to the middle portions thereof. As a result, the cartridge holder 3, i.e., the recording medium, moves in the direction of arrow F, thus reaching the fourth position (i.e., the retraction height position). Although the switch movement angle 7, which moves in an integral manner with the loading mechanism 2, moves from the position illustrated in FIG. 9A to the position illustrated in FIG. 9B, the second mode detection switch 24 and the third mode detection switch 25 are both kept on by the lever portion 7b of the switch movement angle 7 and the switch angle 36.

The relationship between the recording medium, the magnetic head section, the pickup 10, the head movement shaft 5, and the turntable 9a will be described with reference to FIGS. 11A to 11D.

Figure 11A:
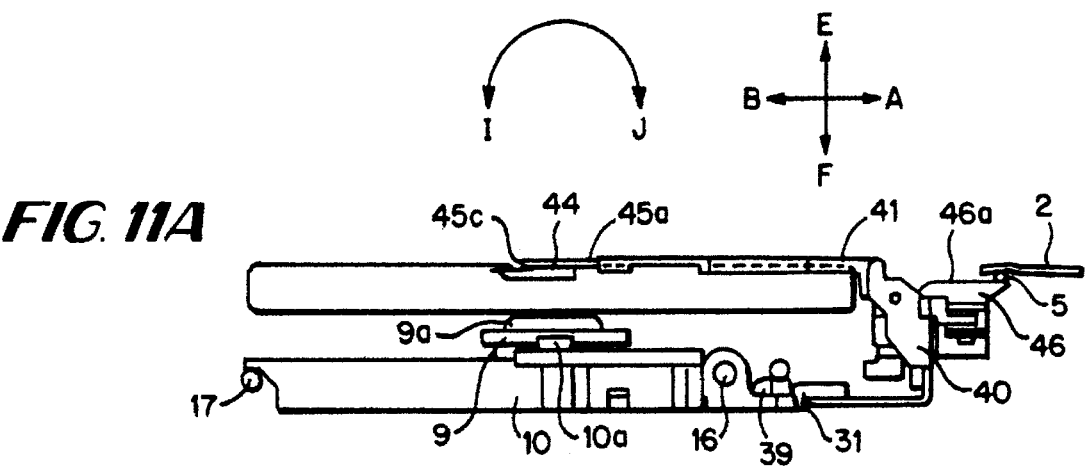
FIG. 11A shows the relative positions of the magnetic head section, the pickup, a head movement shaft, and a turntable of the disk recording/reproduction device shown in FIG. 1 and a cartridge in a pushing complete position.

FIG. 11A illustrates the recording medium in the second position. In this state, the head movement shaft 5 of the loading mechanism 2 abuts with the abutting face 46a of the retraction adjustment angle 46, the magnetic head 44 being retained in the stand-by position. When viewing this state in a direction parallel to the recording face of the disk of the recording medium (i.e., perpendicularly to the paper on which FIGS. 11A to 11D are described, the magnetic head 44 (which is in the retracted position) and the cartridge 50 are overlapping with each other. Accordingly, as compared with conventional techniques in which the magnetic head is retracted out of the loading path of a recording medium by moving in the direction of arrow E, the dimension of the entire device along the direction of arrows E and F can be reduced by the dimension (along the direction of arrows E and F, or the "thickness direction") of the portion of the magnetic head 44 overlapping with the cartridge 50 and a thickness of an interval S shown in FIG. 22A which is required to ensure stable operation of the device. Thus, the thickness of the entire device can be effectively reduced.

Figure 11B:
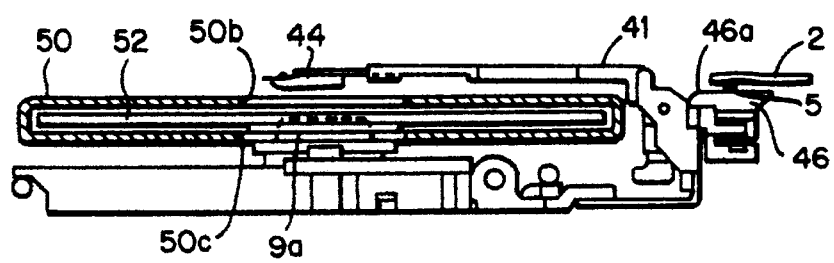
FIG. 11B shows the relative positions of the magnetic head section, the pickup, a head movement shaft, and a turntable of the disk recording/reproduction device shown in FIG. 1 and a cartridge in the movable position.

FIG. 11B illustrates the recording medium in the fourth position. The fourth position is so set that neither the magnetic head 44 nor the object lens 10a of the pickup 10 overlaps with the cartridge 50 when viewed in a direction parallel to the recording face of the disk 52, that is, neither the magnetic head 44 nor the object lens 10a collides with the cartridge 50 when the magnetic head 44 and the pickup 10 are moved from the retracted position to the position opposing the cartridge 50. Moreover, the fourth position is so set that the turntable 9a is inserted in the cartridge 50 through the center opening 50e (the disk 52 not having been chucked onto the turntable 9a). As a result, the fourth position is further shifted in the direction of arrow F, thereby further shifting the position of the magnetic head 44 in the direction of arrow F, so that the dimension of the device along the direction of arrows E and F is even more reduced. The head movement shaft 5, which moves along with the movement of the loading mechanism 2 in the direction of arrow B, abuts with the abutting face 46a of the retraction adjustment angle 46.

Figure 13:
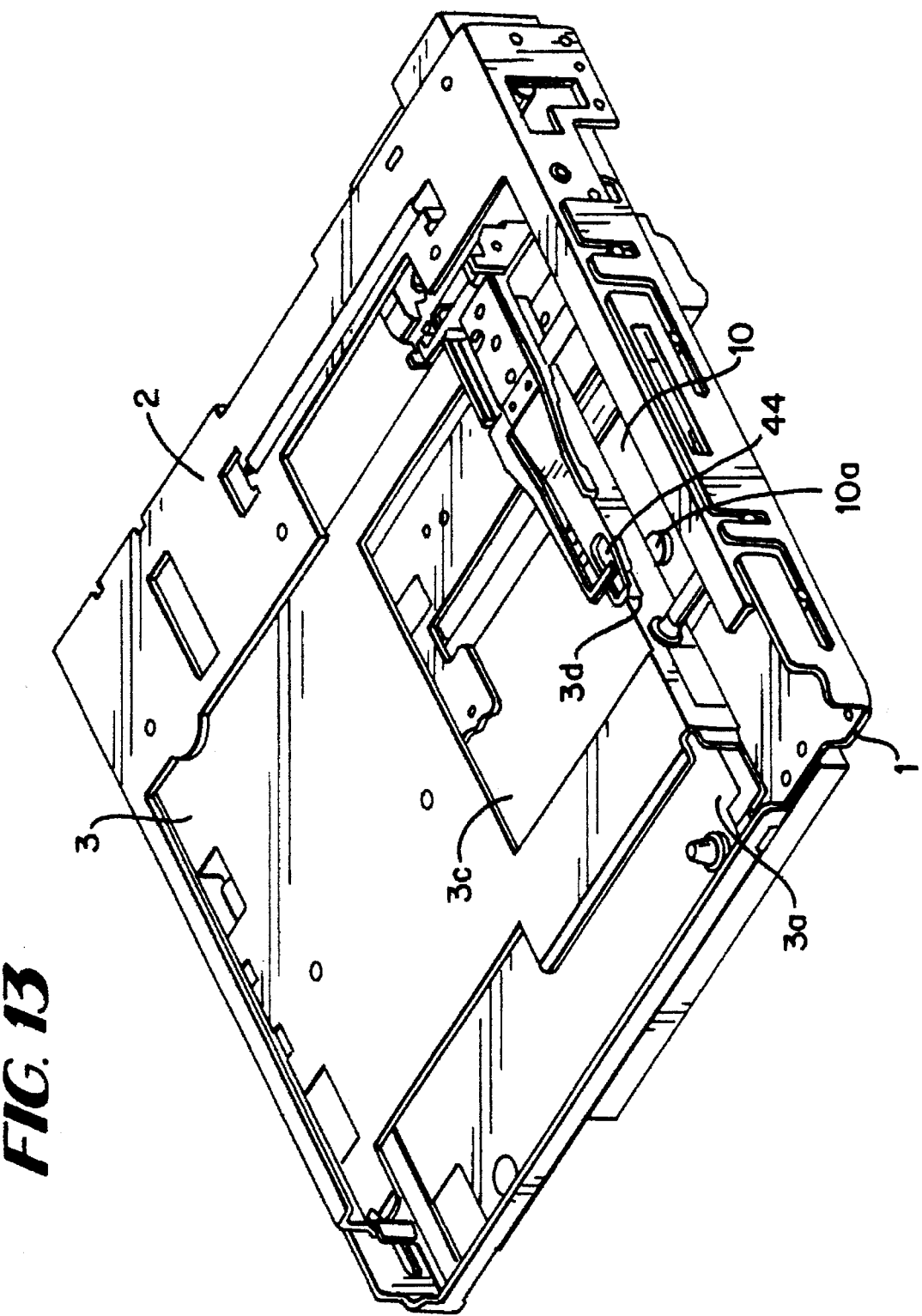
FIG. 13 is a perspective view showing main constituent elements of the disk recording/reproduction device shown in FIG. 1 in the movable position.
Figure 14:
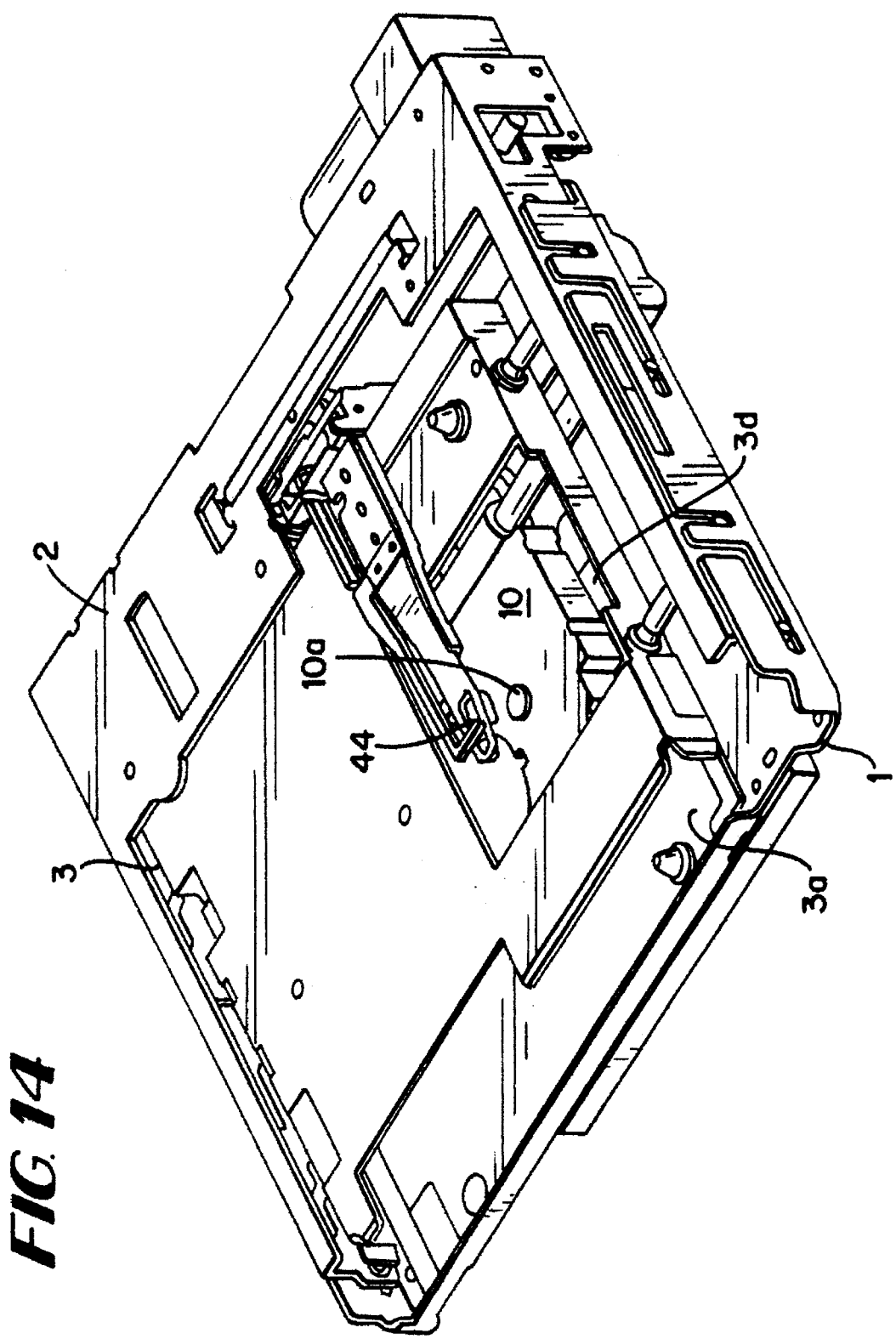
FIG. 14 is a perspective view showing main constituent elements of the disk recording/reproduction device shown in FIG. 1 in the reproducible position.

Thus, by the cartridge detection 14 being turned on, it is detected that the recording medium held in the cartridge holder 3 has arrived at the retraction height position (step S1). The feed motor 20 is driven so as to rotate in a reverse direction (step S2). Then, the driving force of the feed motor 20 is transmitted to the driving screw 31 and to the driving grip 39 engaged therewith via the group of gears 27, 28, 29, 30, and 31a. As with the rotation of the driving screw 31, the pickup 10 and the magnetic head section move in the direction of arrow D in an integral manner. As with the movement of the pickup 10 and the magnetic head section, the magnetic head section including the magnetic head 44 enters the opening 3c through the notch 3d without colliding with the cartridge holder 3, as shown in FIG. 13. The pickup 10 and the magnetic head section move to the position opposing the cartridge, which movement is terminated when the read-in detection switch 11 is turned on. That is, when the read-in detection switch 11 is turned on (step S3), the feed motor 20 is stopped (step S4), and the control proceeds to step S5. In this state, the object lens 10a of the pickup 10 and the magnetic head 44 oppose the disk 52 via the windows 50a and 50b of the cartridge 50.

At step S5, the loading motor 19a is driven so as to rotate in a forward direction, whereby the output axis 19c rotates in the direction of arrow I from the position described in FIG. 10B. As with the movement of the output axis 19c, the loading mechanism 2, which is made ready to move in the direction of arrow B by the spring 4 for loading purposes, also moves in the direction of arrow B apparently in an integral manner. Although the stand-by position detection angle 8 has been made ready to move in the direction of arrow A by the loaded member (not shown), the end faces of the guide grooves 8c in the direction of arrow B are restricted by abutting with the pins 2b of the loading mechanism 2, so that the stand-by position detection angle 8 and the loading mechanism 2 move in an integral manner.

The switch movement angle 7, which moves in an integral manner as with the movement of the loading mechanism 2 in the direction of arrow B, moves in the direction of arrow B, so that the slanted face 7a of the switch movement angle 7 comes in contact with the pin portion 36d of the switch angle 36, as shown in FIG. 9C. The pin portion 36d goes onto the slanted face 7a, and the switch angle 36 moves in the direction of arrow C against the action of the loaded spring 38. As with the movement of the switch angle 36, the second mode detection switch 24 shifts from an on-state to an off-state. When the second mode detection switch 24 is turned off (step S6), the loading motor 19a is stopped (step S7).

As a result, the output axis 19c stops in the position shown in FIG. 10C, and the loading mechanism 2 reaches the reproducible position. The pins 3b of the cartridge holder 3 shift to the lowermost portions of the guide grooves 2a, so that the cartridge holder 3 moves in the direction of arrow F, thereby reaching a mounting height position. Thus, the recording medium held in the cartridge holder 3 reaches a position which allows recording and reproduction, i.e., the third position (recordable position).

Figure 11C:
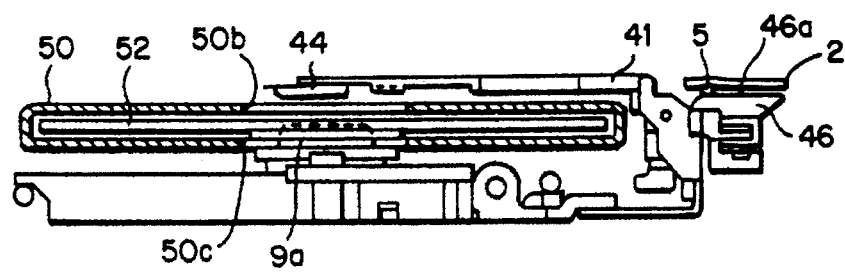
FIG. 11C shows the relative positions of the magnetic head section, the pickup, a head movement shaft, and a turntable of the disk recording/reproduction device shown in FIG. 1 and a cartridge in the reproducible position.

Accordingly, in this state, as shown in FIG. 11C, the disk 52 of the recording medium is chucked on the turntable 9a, and the object lens 10a of the pickup 10 enters the cartridge 50 via the window 50a. However, the head movement shaft 5 of the loading mechanism 2 still abuts with the abutting face 46a of the retraction adjustment angle 46. That is, the magnetic head 44 is in the stand-by position, and the disk recording/reproduction device is waiting for a reproduction position instruction (step S8).

When a reproduction instruction is generated from the operation instruction signal source 56, the reproduction instruction is confirmed at step S9, and a reproduction operation is performed at step S10. At the reproduction operation, as known in the art, a light beam is radiated through the object lens 10a of the pickup 10 onto the recording face of the disk 52, and light reflected from the recording face of the disk 52 is received via the object lens 10a, thereby reading information recorded on the disk 52.

When a recording instruction is generated from the operation instruction signal source 56, the recording instruction is confirmed at step S9, and it is determined whether or not the recording medium is a recordable medium, based on a signal from the disk detection switch 12, at step S11. If the recording medium is determined to be recordable, it is determined whether or not recording is allowed for the recording medium, based on a signal from the write protect detection switch 13, at step 812. If it is determined that recording is allowed, the control proceeds to step S13.

Figure 11D:
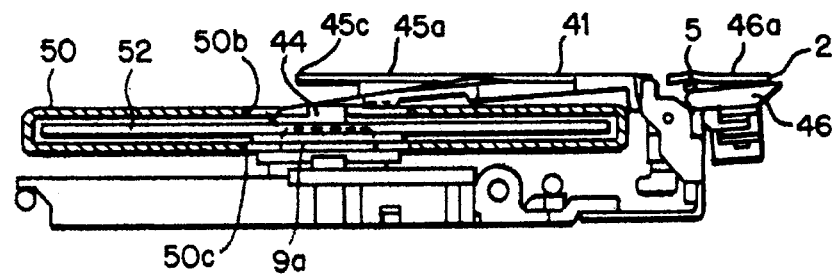
FIG. 11D shows the relative positions of the magnetic head section, the pickup, a head movement shaft, and a turntable of the disk recording/reproduction device shown in FIG. 1 and a cartridge in the recordable position.

At step S13, the loading motor 19a is driven so as to rotate in the forward direction again, and the output axis 19c rotates in the direction of arrow I from the position shown in FIG. 10C. As with the rotation of the output axis 19c, the loading mechanism 2 and the stand-by position detection angle 8 move in the direction of arrow B, thereby reaching the recordable position. The loading mechanism 2 having moved in the direction of arrow B, the head movement shaft 5 shifts from the position shown in FIG. 11C to the position shown in FIG. 11D, whereby the abutment of the head movement shaft 5 and the abutting face 46a of the retraction adjustment angle 46 breaks. Thus, the retraction angle 41 rotates in the direction of arrow I, so that the magnetic head 44, which has been supported in the stand-by position, enters the cartridge 50 through the window 50b as with the rotation of the head attachment lever 45 in the direction of arrow I, as shown in FIG. 11D. As a result, the magnetic head 44 arrives at the recording position, where the magnetic head 44 is in contact with the recording face of the disk 52.

The recording medium itself is in the third position, as shown in FIG. 11C, where recording and reproduction for the recording medium are possible. The restriction of rotation of the retraction angle 41 and the retraction adjustment angle 46 in the direction of arrow I is achieved by the abutting face 46a coming into abutment with the bridge portion of the loading mechanism 2. As the loading mechanism 2 begins to move in the direction of arrow B from the reproducible position, the lever portion 7b of the switch movement angle 7 moves in an integral manner with the loading mechanism 2 so as to turn on the second mode detection switch 24 as shown in FIG. 9E.

By the first mode detection switch 23 being turned on by the bent portion 2f of the loading mechanism 2, it is detected that the loading mechanism 2 has arrived at the recordable position. When the first mode detection switch 23 is turned off (step S14), the loading motor 19a is stopped (step S15). At step S16, as known in the art, the feed motor 20 is driven so as to integrally move the pickup 10 and the magnetic head 44 in parallel to the recording face of the disk 52 and from the inner periphery to the outer periphery, while a recording operation is performed by a magnetic field modification overwrite method. When the recording operation is terminated, the control proceeds to step S17, at which the device waits for a recording position instruction.

If a recording instruction is generated by the operation instruction signal source 56 while the device is waiting for a recording position instruction, the recording instruction is confirmed and the recording operation at step S16 is performed again. If a reproducing instruction is generated by the operation instruction signal source 56 while the device is waiting for a recording position instruction, the reproduction instruction is confirmed and the control proceeds to step S19.

At step S19, the loading motor 19 is driven so as to rotate in the reverse direction. As a result, the output axis 19c rotates in the direction of arrow J, so that the loading mechanism 2 and the stand-by position detection angle 8 move in the direction of arrow A. As a result of the movement of the loading mechanism 2 in the direction of arrow A, the head movement shaft 5 abuts with the abutting face 46a of the retraction adjustment angle 46 again, thereby rotating the retraction angle 41 in the direction of arrow J. Furthermore, the head attachment lever 45 is rotated in the direction of arrow J so as to lift up the magnetic head 44. As a result, the magnetic head 44 is moved to the stand-by position outside the cartridge 50, as shown in FIG. 11C.

By the switch movement angle 7 moving in the direction of arrow A along with the loading mechanism 2, the lever portion 7b detaches from the second mode detection switch 24, thereby turning off the second mode detection switch 24 as shown in FIG. 9D. When the second mode detection switch 24 is detected to have been turned off at step S20, the loading motor 19a is stopped. In this state, the loading mechanism 2 is in the reproducible position. The magnetic head 44, the cartridge 50 of the recording medium, the disk 52, and the like take the relative positions shown in FIG. 11C.

Next, an operation will be described which is performed when an unloading instruction is generated by the operation instruction signal source 56 while the device is in the above-mentioned reproduction position instruction waiting state or recording position instruction waiting state.

When an unloading instruction is generated, the loading motor 19a is driven so as to rotate in the reverse direction (step S22) until the third mode detection switch 25 is detected to have been turned on at step S23. The operations of the respective constituent elements, performed before the loading mechanism 2 moves from the recordable position to the reproducible position, are the same as those described above. The following description of the unloading operation applies to the case where the device is in the reproducible position.

When the loading motor 19a is driven so as to rotate in the reverse order, the output axis 19c begins to rotate in the direction of arrow J, and the loading mechanism 2, the edge 2h of whose output opening 2e abutting with the output axis 19c, and the stand-by position detection angle 8 move in the direction of arrow A from the position shown in FIG. 10C. Then, the slanted face 7a of the switch movement angle 7 detaches from the pin 36d, so that the switch angle 36 moves in the direction of arrow D owing to the action of the loaded spring 38, thereby turning on the second mode detection switch 24.

Then, as with the movement of the loading mechanism 2 in the direction of arrow A, the pins 3b of the cartridge holder 3 shift from the lowermost potions to the middle portions of the guide grooves 2a, thereby elevating the cartridge holder 3 from the mounting height to the retraction height. In other words, the cartridge 50 of the recording medium is elevated from the third position shown in FIG. 11C to the fourth position shown in FIG. 11B. At this point, the lever portion 7b of the switch movement angle 7 turns on the third mode detection switch 25.

When the third mode detection switch 25 is detected to have been turned on, the loading motor 19a is stopped at step S24, and the feed motor 20 is driven so as to rotate in the forward direction at step S25. Owing to the rotation of the driving screw 31, the pickup 10 and the magnetic head section move in the direction of arrow C, thereby moving from the position opposing the cartridge 50 to the retracted position. The manipulation portion 40e of the head base angle 40 turns on the retracted position detection switch 18, whereby the completion of the shift to the retracted position is detected (step S26). The feed motor 20 is stopped at step S27, and the loading motor 19a is driven so as to rotate in the reverse direction at step S28.

Then, the output axis 19c rotates in the direction of arrow J from the position shown in FIG. 10B, thereby moving the loading mechanism 2 and the stand-by position detection angle 8 in the direction of arrow A. As a result, as shown in FIG. 10D, the fourth mode detection switch 26 is turned on by the stand-by position detection angle 8. Then, the engagement of the bent portion 2f of the loading mechanism 2 with the end edge 22f of the ejection lever 22 breaks. At this point, the pins 3b of the cartridge holder 3 have shifted to the uppermost portions of the guide grooves 2a, thereby elevating the cartridge holder 3 from the retraction height to the mounting height. That is, the cartridge 50 of the recording medium is in the second position.

Accordingly, when the engagement of the end edge 22f of the ejection lever 22 with the bent portion 2f breaks, the ejection lever 22 rotates in the direction of arrow G owing to the action of the loaded spring, so that the kicking portion 22c thereof kicks out the cartridge 50, or the recording medium, in the direction of arrow B. Thus, the recording medium is placed in the first position, ready to be taken out.

As with the rotation of the ejection lever 22 in the direction of arrow G, the bent portion 2f of the loading mechanism 2 engages with the arc-shaped edge 22e of the ejection lever 22, so that the loading mechanism 2 is prevented from moving in the direction of arrow B, against the action of the spring 4 for loading purposes. The first mode detection switch 23 is turned on by the pin 22g.

When the first mode detection switch 23 is detected to have been turned on at step S29, the loading motor 19a is stopped at step S30.

At this stage, the output axis 19c is in the position shown in FIG. 10D, so that the loading motor 19a is driven so as to rotate in the forward direction (step S31). As a result, the output axis 19c rotates in the direction of arrow I from the position shown in FIG. 10D. However, the loading mechanism 2 is prevented from moving in the direction of arrow B owing to the engagement with the ejection lever 22. Only the stand-by position detection angle 8 moves in the direction of arrow B against the action of the spring.

The movement of the stand-by position detection angle 8 in the direction of arrow B turns off the fourth mode detection switch 26, as shown in FIG. 10A. When the fourth mode detection switch 26 is detected to have been turned off (step S32), the loading motor 19a is stopped at step S33. Thus, the device enters a stand-by state.

In the above example, a loading mechanism, which is composed essentially of the main chassis 1, the loading mechanism 2, the cartridge holder 3, the spring 4 for loading purposes, the loading motor 19a, and the like, moves from a first position located outside the device, where a recording medium is allowed to be taken out, in a first direction (i.e., in the direction of arrow A) in a substantially linear manner so as to guide the recording medium to a second position located inside the device, and thereafter guides the recording medium in a second direction (i.e., in the direction of arrow F) substantially perpendicular to the first direction from the second position to a third position, where information can be recorded on the recording medium.

A pickup driving mechanism is composed essentially of the feed motor 20, the driving screw 31, the driving grip 39, and the like. A head position switching mechanism for moving the magnetic head 44 so as to detach from the recording face of the disk 52 and position in either the recordable position or the stand-by position in a selective manner is composed essentially of the head movement shaft 5, the retraction angle 41, the retraction adjustment angle 46, and the like. A fourth position retention mechanism is composed essentially of the guide grooves 2a of the loading mechanism 2, the pins 3b of the cartridge holder 3, the output axis 19c, and the like.

In the above example, the height (taken along the direction of arrows E and F) of the magnetic head 44 in its retracted position is so set that the magnetic head 44 overlaps with the recording medium in the second position when viewed in a direction parallel to the recording face of the disk 52. As a result, the thickness of the entire device can be reduced. Moreover, the fourth position of the recording medium is so set that the turntable 9a is inserted in the cartridge 50. As a result, the fourth position, and consequently the retracted position of the magnetic head 44, can be set at a relatively low position, whereby the reduction of the thickness of the entire device can be enhanced. Moreover, the pickup 10 and the magnetic head 44 always move in an integral manner, so that the pickup 10 and the magnetic head 44 always oppose each other with a desired accuracy. The relative positions of the pickup 10 and the magnetic head 44 are not likely to change after a long lapse of time, thereby preventing the recording characteristics of the device from deteriorating. Accordingly, a disk recording/reproduction device having a reliable performance can be provided.

Moreover, by employing the pickup driving mechanism in order to move the pickup 10 and the magnetic head 44 to the retracted position, the structure of the device can be simplified, and the production cost can be prevented from increasing.

In the above example, after the recording medium is pushed into the second position, the recording medium is moved to the fourth position by utilizing the action of the spring 44 for loading purposes, thereby realizing a quick movement.

When the recording medium is in the first or second position, the magnetic head 44 and the pickup 10 are prevented from moving toward the position opposing the cartridge 50, i.e., in the direction of arrow D, by the cartridge holder 3. As a result, even if extrinsic force such as vibration or an impact is applied to the device from the outside, the magnetic head 44 is prevented from being destroyed through collision with the cartridge holder 3 because the manipulation portion 40e of the head base angle 40, for example, abuts with the cartridge holder 3 so as to prevent the magnetic head 44 from moving.

When the recording medium is in the third position, the magnetic head 44 and the pickup 10 are prevented from moving toward the retracted position, i.e., in the direction of arrow C, because the top end 40d of the side wall 40h abuts with the end edge 2g of the loading mechanism 2. In other words, the top end 40d of the side wall 40h abuts with the end edge 2g of the loading mechanism 2 when the magnetic head section and the pickup 10 try to move in the direction of arrow C beyond the extent allowed in a recording or reproduction operation. Thus, the magnetic head 44 and the object lens 10a of the pickup 10 is prevented from being destroyed due to collision with the edges of the windows 50a and 50b of the cartridge 50.

Furthermore, in the above example, the detection of the movable position and the reproducible position are achieved by different methods using the mode detection switches, depending on the direction of the movement of the loading mechanism 2, i.e., either the loading direction or the unloading direction. Thus, the movable position and the reproducible position are at a distance with each other with respect to the movement of the loading mechanism 2. Accordingly, it is possible to achieve separate position detection at the movable position, the reproducible position, and at any position therebetween, thereby making it possible to detect the position, or the mode, or the disk recording/reproduction device when the device is turned on or in time of a power failure, without moving the loading mechanism 2. Moreover, the loading mechanism 2 is prevented from overrunning by the loading motor 19a.

In accordance with the disk recording/reproduction device of the present invention, the magnetic head is not required to travel perpendicularly with respect to the recording face of the disk in order to move out of a loading path, but travels in parallel to the recording face from the position opposing the protective case to the retracted position away from the opposing position. Thus, the dimensions of the entire device along a thickness direction thereof can be reduced. Moreover, a configuration can be adopted in which the magnetic head is always moved in an integral manner with the pickup, so that the reliability of the operation of the device improves. Once the pickup and the magnetic head are adjusted to be positioned so as to oppose each other, their relative positions never change, whereby stable recording characteristics can be provided based on the precise relative positions of the pickup and the magnetic head.

Figure 22A:
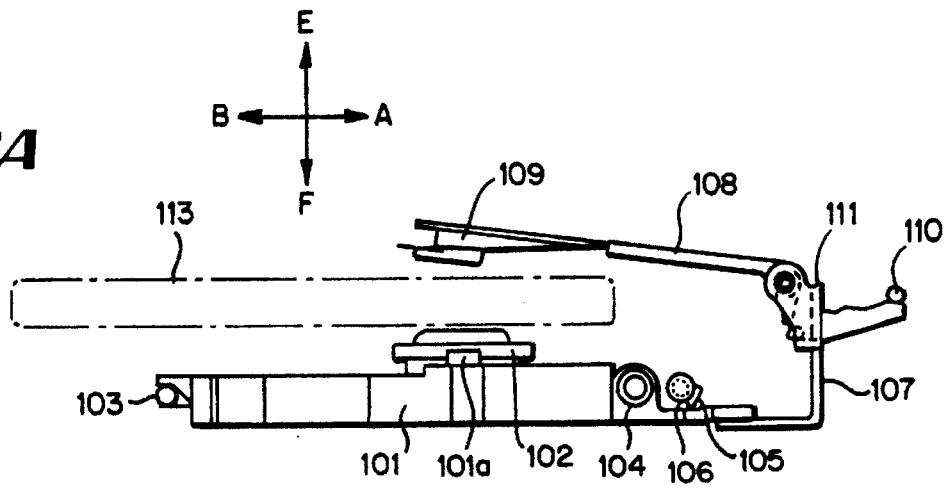
FIG. 22A is a view showing an operation of a conventional disk recording/reproduction device of a front-loading type.
Figure 22B:
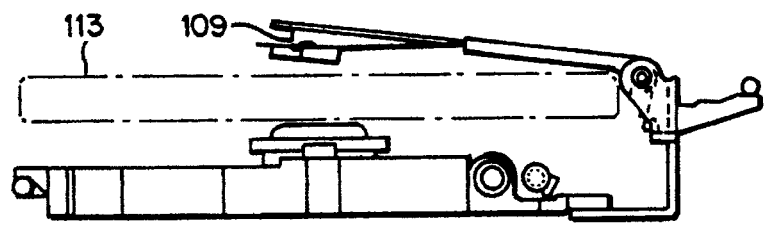
FIG. 22B is a view showing an operation of a conventional disk recording/reproduction device of a front-loading type.
Figure 22C:
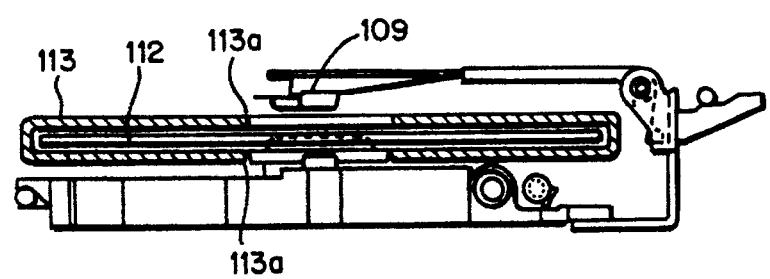
FIG. 22C is a view showing an operation of a conventional disk recording/reproduction device of a front-loading type.
Figure 22D:
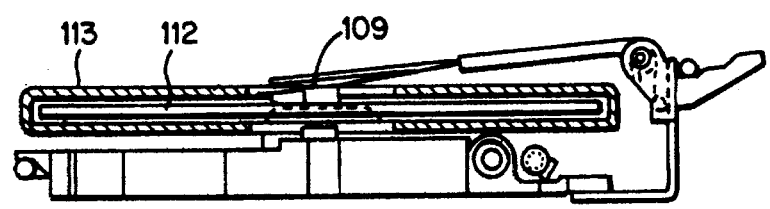
FIG. 22D is a view showing an operation of a conventional disk recording/reproduction device of a front-loading type.

In accordance with the disk recording/reproduction device of the present invention, the thickness of the entire device can be reduced by at least the dimension of a portion of the magnetic head (along the thickness direction) that overlaps with the protective case and a thickness of an interval S shown in FIG. 22A which is required to ensure stable operation of the device. Thus, the thickness of the entire device can be effectively reduced.

By employing a pickup driving mechanism in order to move the pickup from the position opposing the protective case to the retracted position, it becomes unnecessary to provide a separate driving mechanism for moving the magnetic head to the retracted position. By thus employing the pickup driving mechanism for double purposes, the structure of the device can be simplified.

Even if vibration or an impact is applied to the device from the outside, the magnetic head, as well as the pickup, is prevented from inadvertently moving out of the position opposing the protective case. Accordingly, the magnetic head and the pickup are prevented from being destroyed owing to an unintended movement thereof.

Since the prevention of the undesirable movement of the magnetic head can be achieved by using constituent elements for loading the recording medium, the structure of the device can be further simplified.

Since the movement of the magnetic head and the pickup from the retracted position to the position opposing the protective case, or vice versa, can be controlled based on detected positions of the recording medium, the movement the magnetic head and the pickup can be correctly timed. In other words, malfunctions such as the magnetic head or the pickup getting caught by the protective case of the recording medium will be prevented.

By prescribing the fourth position in the closest possible location to the third position, the magnetic head can be positioned in such a manner that the reduction in the thickness of the entire device can be most effectively attained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk recording/reproduction device comprising:

a recording medium comprising a disk having at least one recording face thereon and a protective case for accommodating the disk;

loading means for guiding the recording medium from a first position located outside the disk recording/reproduction device in a first direction in a substantially linear manner, guiding the recording medium to a second position located inside the disk recording/reproduction device, and thereafter guiding the recording medium in a second direction substantially perpendicular to the first direction from the second position to a third position, wherein the first position allows the recording medium to be inserted and taken out and the third position allows information to be recorded on the recording face of the disk;

a pickup for radiating a laser light beam on the recording face of the disk;

pickup driving means for moving the pickup in parallel to the recording face of the disk;

a magnetic head opposing the pickup with the recording medium interposed therebetween and the magnetic head moving in parallel to the recording face of the disk in an integral manner with the pickup such that the pickup and the magnetic head always oppose each other; and head position switching means for moving the magnetic head so as to detach from the recording face and positioning the magnetic head in either a recordable position or a stand-by position in a selective manner;

wherein the disk recording/reproduction device further comprises position retention means for locating the recording medium in a fourth position present between the second position and the third position;

the magnetic head moves to the recordable position when the recording medium is in the third position, the magnetic head and the pickup thus recording information on the recording face of the disk; and the magnetic head and the pickup are provided in such a manner such that the pickup driving means moves the magnetic head and the pickup together between a position opposing the protective case of the recording medium and a retracted position away from the position opposing the protective case, and when the recording medium is retained in the fourth position, the magnetic head and the pickup are moved from the position opposing the protective case to the retracted position and from the retracted position to the position opposing the protective case.

2. A disk recording/reproduction device according to claim 1, wherein the retracted position of the magnetic head is set so that the magnetic head overlaps with the protective case in the second position when viewed in a direction parallel to the recording face of the disk.

3. A disk recording/reproduction device according to claim 2, wherein a movable range of the pickup achieved by the pickup driving means includes the retracted position.

4. A disk recording/reproduction device according to claim 1, wherein a movable range of the pickup achieved by the pickup driving means includes the retracted position.

5. A disk recording/reproduction device according to claim 1, wherein the loading means comprises a case holder moving at least between the second position and the third position with the recording medium being accommodated in the case holder, and a moving path of the magnetic head from the retracted position to the position opposing the protective case is obstructed by the case holder when the recording medium is in the first position and in the second position.

6. A disk recording/reproduction device according to claim 1, wherein the loading means comprises an operation member sliding due to driving force from a loading driving source so as to move the recording medium at least between the second position and the third position, and a moving path of the magnetic head from the position opposing the protective case to the retracted position is obstructed by the operation member when the recording medium is in the third position.

7. A disk recording/reproduction device according to claim 1, wherein the loading means comprises an operation member sliding due to driving force from a loading driving source and a case holder for accommodating the recording medium and moving between the second position and the third position along with the sliding of the operation member, and a moving path of the magnetic head from the position opposing the protective case to the retracted position is obstructed by the operation member when the recording medium is in the third position, and a moving path of the magnetic head from the retracted position to the position opposing the protective case is obstructed by the case holder when the recording medium is in the first position and the second position.

8. A disk recording/reproduction device according to claim 1 further comprising position detection means for detecting a position of the recording medium and control means for controlling the movement of the magnetic head and the pickup between the position opposing the protective case and the retracted position based on a signal from the position detection means.

9. A disk recording/reproduction device according to claim 1, wherein the fourth position is set so that a turntable for mounting the disk thereon so as to rotate the disk is inserted in the protective case and so that the magnetic head and the pickup are prevented from colliding with the protective case while moving.

* * * * *